United States Patent
Pang et al.

(10) Patent No.: US 10,412,387 B2
(45) Date of Patent: Sep. 10, 2019

(54) UNIFIED INTRA-BLOCK COPY AND INTER-PREDICTION

(71) Applicant: QUALCOMM Incorporated, San Diego, CA (US)

(72) Inventors: Chao Pang, Marina del Rey, CA (US); Krishnakanth Rapaka, San Diego, CA (US); Ye-Kui Wang, San Diego, CA (US); Joel Sole Rojals, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 14/831,644

(22) Filed: Aug. 20, 2015

(65) Prior Publication Data

US 2016/0057420 A1 Feb. 25, 2016

Related U.S. Application Data

(60) Provisional application No. 62/040,985, filed on Aug. 22, 2014.

(51) Int. Cl.
*H04N 19/124* (2014.01)
*H04N 19/176* (2014.01)
(Continued)

(52) U.S. Cl.
CPC ......... *H04N 19/124* (2014.11); *H04N 19/159* (2014.11); *H04N 19/176* (2014.11);
(Continued)

(58) Field of Classification Search
CPC .. H04N 19/124; H04N 19/523; H04N 19/593; H04N 19/70; H04N 19/52; H04N 19/513; H04N 19/176; H04N 19/159
See application file for complete search history.

(56) References Cited

U.S. PATENT DOCUMENTS 9,008,181 B2  4/2015  Chen et al.
9,066,102 B2  6/2015  Chen et al.
(Continued)

FOREIGN PATENT DOCUMENTS

CN  101658044 A  2/2010
JP  2005167852 A  6/2005
(Continued)

OTHER PUBLICATIONS

Li, B. and J, Xu, Non-SCCE1: Unification of Intra BC and Inter modes, Joint Collaborative Team on Video Coding (JCT-VC) of ITU-T-SG WP3 and ISO/IEC JTC 1/SC 29/WG 11, 18th Meeting: Sapporo, JP, Jun. 30-Jul. 9, 2014 (from IDS).*

(Continued)

*Primary Examiner* — Richard A Hansell, Jr.
(74) *Attorney, Agent, or Firm* — Shumaker & Sieffert, P.A.

(57) ABSTRACT

A video coder may include a current picture and a reference picture in a reference picture list. The video coder may determine a co-located block of the reference picture. The co-located block is co-located with a current block of the current picture. Furthermore, the video coder derives a temporal motion vector predictor from the co-located block and may determine the temporal motion vector predictor has sub-pixel precision. The video coder may right-shift the temporal motion vector predictor determined to have sub-pixel precision. In addition, the video coder may determine, based on the right-shifted temporal motion vector predictor, a predictive block within the current picture.

28 Claims, 7 Drawing Sheets

(51) Int. Cl.
  *H04N 19/513* (2014.01)
  *H04N 19/52* (2014.01)
  *H04N 19/159* (2014.01)
  *H04N 19/70* (2014.01)
  *H04N 19/593* (2014.01)
  *H04N 19/523* (2014.01)

(52) U.S. Cl.
  CPC .......... *H04N 19/513* (2014.11); *H04N 19/52* (2014.11); *H04N 19/523* (2014.11); *H04N 19/593* (2014.11); *H04N 19/70* (2014.11)

(56) References Cited

U.S. PATENT DOCUMENTS

| | | | |
|---|---|---|---|
| 9,078,007 B2 | 7/2015 | Karczewicz et al. | |
| 9,172,956 B2 | 10/2015 | Lim et al. | |
| 9,313,519 B2* | 4/2016 | Lou | H04N 19/46 |
| 2005/0073449 A1* | 4/2005 | Van Der Vleuten | H03M 7/4006 341/107 |
| 2008/0198936 A1 | 8/2008 | Srinivasan et al. | |
| 2008/0253459 A1 | 10/2008 | Ugur et al. | |
| 2010/0177776 A1 | 7/2010 | Crinon et al. | |
| 2012/0051431 A1* | 3/2012 | Chien | H04N 19/105 375/240.16 |
| 2012/0263235 A1* | 10/2012 | Sugio | H04N 19/513 375/240.16 |
| 2013/0188697 A1* | 7/2013 | Ye | H04N 19/503 375/240.12 |
| 2014/0185682 A1 | 7/2014 | Chen et al. | |
| 2014/0226721 A1 | 8/2014 | Joshi et al. | |
| 2015/0098504 A1 | 4/2015 | Pang et al. | |
| 2015/0195532 A1 | 7/2015 | Nakagami | |
| 2015/0195559 A1 | 7/2015 | Chen et al. | |
| 2015/0264386 A1 | 9/2015 | Pang et al. | |
| 2015/0271487 A1 | 9/2015 | Li et al. | |
| 2015/0271515 A1 | 9/2015 | Pang et al. | |
| 2015/0312588 A1 | 10/2015 | Yamamoto et al. | |
| 2015/0326866 A1 | 11/2015 | Ikai et al. | |
| 2015/0373334 A1 | 12/2015 | Rapaka et al. | |
| 2015/0373362 A1 | 12/2015 | Pang et al. | |
| 2016/0100189 A1 | 4/2016 | Pang et al. | |
| 2016/0255361 A1 | 9/2016 | Lim et al. | |
| 2016/0337649 A1* | 11/2016 | Chuang | H04N 19/159 |
| 2018/0160141 A1* | 6/2018 | He | H04N 19/521 |

FOREIGN PATENT DOCUMENTS

| | | | |
|---|---|---|---|
| KR | 20140044403 A | 4/2014 | |
| RU | 2493669 C1 | 9/2013 | |
| WO | 2010039288 A1 | 4/2010 | |
| WO | 2012067966 A1 | 5/2012 | |
| WO | 2012102973 A1 | 8/2012 | |
| WO | 2013047811 A1 | 4/2013 | |
| WO | WO-2013053309 A1 * | 4/2013 | H04N 19/597 |
| WO | WO-2013059470 A1 * | 4/2013 | H04N 19/197 |
| WO | 2014103529 A1 | 7/2014 | |
| WO | 2015052273 A1 | 4/2015 | |
| WO | 2015124110 A1 | 8/2015 | |
| WO | 2015143395 A1 | 9/2015 | |
| WO | WO-2015192353 A1 * | 12/2015 | H04N 19/70 |

OTHER PUBLICATIONS

Sullivan G.J. et al. Standardized Extensions of High Efficiency Video Coding (HEVC), IEEE Journal of Selected Topics in Signal Processing, vol. 7, No. 6, Dec. 2013.*
Li, B. and J, Xu, Non-SCCEI: Unification of Intra BC and Inter modes, Joint Collaborative Team on Video Coding (JCT-VC) of ITU-T-SG WP3 and ISO/IEC JTC 1/SC 29/WG 11, 18th Meeting: Sapporo, JP, Jun. 30-Jul. 9, 2014 (from IDS) (Year: 2014).*
Sullivan G.J. et al. Standardized Extensions of High Efficiency Video Coding (HEVC), IEEE Journal of Selected Topics in Signal Processing, vol. 7, No. 6, Dec. 2013 (Year: 2013).*
Response to Written Opinion dated Nov. 3, 2015, from International Application No. PCT/US2015/046351, filed Jun. 22, 2016, 5 pp.
Second Written Opinion from International Application No. PCT/US2015/046351, dated Aug. 1, 2016, 10 pp.
Response to Second Written Opinion dated Aug. 1, 2016, from International Application No. PCT/US2015/046351, filed on Sep. 30, 2016, 8 pp.
International Preliminary Report on Patentability for International Application No. PCT/US2015/046351, dated Dec. 21, 2016, 12 pp.
International Search Report and Written Opinion from International Application No. PCT/US2015/046351, dated Nov. 3, 2015, 15 pp.
Joshi, et al., "HEVC Screen Content Coding Draft Text 1", 18th Meeting;Jun. 30-Jul. 9, 2014, Sapporo, JP; (Joint Collaborative Team on Video Coding of ISO/IEC JTC1/SC29/WG11 and ITU-T SG.16 ); URL: http://wftp3.itu.int/av-arch/jctvc-site/,, No. JCTVC-R1005_v3, Sep. 27, 2014 XP030116693, 346 pages.
Li, et al., °Non-SCCE1: Unification of Intra BC and Inter Modes, 18th Meeting; Jun. 30-Jul. 9, 2014; Sapporo, JP; (Joint Collaborative Team on Video Coding of ISO/IEC JTC1/SC29/WG11 and ITU-T SG.16 ); URL: http://wftp3.itu.int/av-arch/jctvc-site/,, No. JCTVC-R0100_r1, Jun. 29, 2014, XP030116357, 28 pp.
Lin, et al., "Improved Advanced Motion Vector Prediction," 4th Meeting 95. Jan. 20 through 28, 2011; MEGU; (Joint Collaborative Team on Video Coding of ISO/IEC JTC1/SC29/WG11 AND ITU-T SG. 16); No. JCTVC-D125, Jan. 15, 2011, XP030008165, ISSN: 0000-0015; pp. 1-8.
Pang, et al., "SCCE1: Test 3.1—Block vector prediction method for Intra block copy", 18th Meeting; Jun. 30 through Jul. 9, 2014; Sapporo, JP; (Joint Collaborative Team on Video Coding of ISO/IEC JTC1/SC29/WG11 and ITU-T SG.16); URL: http://wftp3.itu.int/av-arch/jctvc-site/, No. JCTVC-R0185-v2, Jul. 2, 2014, XP030116475, 8 pages.
Pang, et al., "Non-RCE3: Intra Motion Compensation with 2-D MVs", 14. JCT-VC Meeting; Jul. 25, 2013 through Aug. 2, 2013; Vienna, AT; (Joint Collaborative Team on Video Coding of ISO/IEC JTC1/SC29/WG11 and ITU-TSG . 16) ; URL : http://wftp3.itu.int/av-arch/jctvc-site/,, No. JCTVC-N0256-v4, Aug. 2, 2013, pp. 1-12, XP030114777.
Zhou, et al., "RCE1: Subtest 1—Motion Vector Resolution Control", 17th Meeting; Mar. 27, 2014 through Apr. 4, 2014; Valencia, ES; (Joint Collaborative Team on Video Coding of ISO/IEC JTC1/SC29/WG11 and ITU-T SG.16 ); URL: http://wftp3.itu.int/av-arch/jctvc-site/, No. JCTVC-Q0155_r1, Mar. 26, 2014, XP030116094, 5 pp.
Bross et al., "High Efficiency Video Coding (HEVC) text specification draft 10 (for FDIS & Last Call)", 12th Meeting; Jan. 14 through 23, 2013, Geneva, CH; (Joint Collaborative Team on Video Coding (JCT-VC) of ITU-T SG 16 WP 3 and ISO/IEC JTC 1/SC 29/WG 11); JCTVC-L1003_v34, Mar. 19, 2013, 310 pp.
Pang, et al., "Non-RCE3: Intra Motion Compensation with 2-D MVs", 14th Meeting; Jul. 25, 2013 through Aug. 2, 2013; Vienna, AT; (Joint Collaborative Team on Video Coding of ISO/IEC JTC1/SC29/WG11 and ITU-TSG . 16) ; URL : http://wftp3.itu.int/av-arch/jctvc-site/,, No. JCTVC-N0256-v3, Jul. 27, 2013, pp. 1-12, XP030114777.
Flynn et al., "High Efficiency Video Coding (HEVC) Range Extensions text specification: Draft 7", 17th Meeting, Mar. 27 through Apr. 4, 2014, Valencia, ES; (Joint Collaborative Team on Video Coding (JCT-VC) of ITU-T SG 16 WP 3 and ISO/IEC JTC 1/SC 29/WG 11), No. JCTVC-Q1005_v4, Apr. 10, 2014, 376 pp.
Joshi R., et al., "HEVC Screen Content Coding Draft Text 1", 18th Meeting;Jun. 30 through Jul. 9, 2014, Sapporo, JP; (Joint Collaborative Team on Video Coding of ISO/IEC JTC1/SC29/WG11 and ITU-T SG.16 ); URL: http://wftp3.itu.int/av-arch/jctvc-site/,, No. JCTVC-R1005 Aug. 9, 2014, XP030116693, 360 pages.
Wang et al., "High Efficiency Video Coding (HEVC) Defect Report 2", 15th Meeting, Oct. 23 through Nov. 1, 2013, Geneva, CH; (Joint Collaborative Team on Video Coding (JCT-VC) of ITU-T SG 16 WP 3 and ISO/IEC JTC 1/SC 29/WG 11), JCTVC-O1003_v2, Nov. 24, 2013, 311 pp.

(56) References Cited

OTHER PUBLICATIONS

Wiegand et al., "WD1: Working raft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Bross et al., "Editor's proposed corrections to HEVC version 1", 13th Meeting, Apr. 18 through 26, 2013, Incheon, KR; (Joint Collaborative Team on Video Coding (JCT-VC) of ITU-T SG 16 WP 3 and ISO/IEC JTC 1/SC 29/WG 11); JCTVC-M0432_v3,Apr. 25, 2013, 310 pp.
Wang et al., "High Efficiency Video Coding (HEVC) Defect Report 4", 17th Meeting, Mar. 27 through Apr. 4, 2014, Valencia, ES; (Joint Collaborative Team on Video Coding (JCT-VC) of ITU-T SG 16 WP 3 and ISO/IEC JTC 1/SC 29/WG 11); JCTVC-Q1003(v.1), May 28, 2014, 314 pp.
ITU-T H.223, Series H: Audiovisual and Multimedia Systems, Infrastructure of audiovisual services—Transmission of multiplexing and synchronization—Multiplexing Protocol for low bit rate multimedia communication, The International Telecommunication Union. Jul. 2001, 74 pp.
ITU-T H.263 "Series H: Audiovisual and Multimedia Systems Infrastructure of audiovisual service-Coding of moving video: Video coding for low bitrate communication," Jan. 2005, 226 pages.
Pang, et al., "Intra Motion Compensation with 2-D MVs JCTVC-N0256", 14th Meeting; Jul. 25, 2013 through Aug. 2, 2013; Vienna, AT; (Joint Collaborative Team on Video Coding of ISO/IEC JTC1/SC29/WG11 and ITU-TSG . 16) ; URL : http://wftp3.itu.int/av-arch/jctvc-site/,, No. JCTVC-N0256, Jul. 27, 2013, 21 pp.
Yu et al., "Requirements for an extension of HEVC for coding of screen content," ISO/IEC JTC 1/SC 29/WG 11 Requirements subgroup, San Jose, California, USA, document MPEG2013/N14174, Jan. 2014, 5 pp.
Li, et al., °Non-SCCE1: Unification of Intra BC and Inter Modes, 18th Meeting; Jun. 30-Jul. 9, 2014; Sapporo, JP; (Joint Collaborative Team on Video Coding of ISO/IEC JTC1/SC29/WG11 and ITU-T SG.16 ); URL: http://wftp3.itu.int/av-arch/jctvc-site/,, No. JCTVC-R0100 , Jun. 20, 2014, XP030116357, 27 pp.
Boyce J., et al., "High level syntax hooks for future extensions", 8. JCT-VC Meeting; 99. MPEG Meeting; Feb. 1-10, 2012 ; San Jose, USA; (Joint Collaborative Team on Video Coding of ISO/IEC JTC1/SC29/WG11 and ITU-T SG.16); URL: http:// wftp3.itu.int/av-arch/jctvc-site/, No. JCTVC-H0388, Jan. 21, 2012, XP030111415, pp. 1-8.
Budagavi M. et al., "AHG8: Video coding using Intra motion compensation", 13. JCT-VC Meeting; 104. MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/,, No. JCTVC-M0350, Apr. 9, 2013 , XP030114307, 3 pp.
Flynn D., et al., "Hevc Range Extensions Draft 6", 16. JCT-VC Meeting; Jan. 9-17, 2014; San Jose, USA; (Joint Collaborative Team on Video Coding of ISO/IEC JTC1/SC29/WG11 and ITU-T SG.16); URL: http://wftp3.itu.int/av-arch/jctvc-site/, No. JCTVC-P1005-v4, Apr. 3, 2014 , 356 Pages, XP030115878.
Joshi, et al., "High Efficiency Video Coding (HEVC) Screen Content Coding Draft 1," Joint Collaboration Team of Video Coding, ITU-T SG 16 WP 3 and ISO/IEC JTC 1/SC 29/WG 11, Jun. 30-Jul. 9, 2014, Document JCTVC-R1005_V3, Sep. 27, 2014, 362 pp.
Pettersson M., et al., "HLS: Dependent RAP Indication SEI message", 18. JCT-VC meeting, Jun. 30 through Jul. 9, 2014, Sapporo, JP; (Joint Collaborative Team on Video Coding of ISO/IEC JTC1/SC29/WG11 and ITU-T SG.16 ), URL: http://wftp3.itu.int/AV-ARCH/JCTVC-SITE/, No. JCTVC-R0059, Jun. 19, 2014, XP030116302, 5 pp.
Rapaka R., et al., "On intra block copy merge vector handling," Joint Collaborative Team on Video Coding (JCT-VC) of ITU-T SG 16 WP 3 and ISO/IEC JTC 1/SC 29/WG 11, 22nd Meeting: Geneva, CH, Oct. 15-21, 2015, Document No. JCTVC-V0049r1, Oct. 15, 2015, 2 pp.
Sjoberg, R., et al., "Absolute signaling of reference pictures", 6. JCT-VC Meeting; 97. MPEG Meeting; Jul. 14-22, 2011; Torino; (Joint Collaborative Team on Video Coding of ISO/IEC JTC1/SC29/WG11 and ITU-T SG.16 ); URL: http://wftp3.itu.int/av-arch/jctvc-site/., No. JCTVC-F493, Jul. 1, 2011,XP030009516, pp. 10 pp.
Wang, et al., "High Efficiency Video Coding (HEVC) Defect Report 4," Joint Collaboration Team of Video Coding, ITU-T SG 16 WP 3 and ISO/IEC JTC 1/SC 29/WG 11, Mar. 27-Apr. 4, 2014, Document JCTVC-Q1003 (V.1), May 28, 2014, 314 pp.
Xu X., et al., "On Unification of Intra Block Copy and Inter-picture Motion Compensation," 17. JCT-VC Meeting; Mar. 27 through Apr. 4, 2014; Valencia, ES; (Joint Collaborative Team on Video Coding of ISO/IEC JTC1/SC29/WG11 and ITU-T SG.16); URL: http://wftp3.itu.int/av-arch/jctvc-site/, No. JCTVC-Q0132-v5, Apr. 3, 2014, XP030116062, 14 pages.
Third Written Opinion dated Nov. 2, 2016 for International Application No. PCT/US2015/046351, 10 pp.
Response to Third Written Opinion dated Nov. 2, 2016 for International Application No. PCT/US2015/046351, filed on Dec. 2, 2016, 10 pp.
Chen J., et al., "Description of Screen Content Coding Technology Proposal by Qualcomm", 17. JCT-VC Meeting, Valencia, (Joint Collaborative Team on Video Coding of ISO/IEC JTC1/SC29/

(56) References Cited

OTHER PUBLICATIONS

WG11 and ITU-T SG.16), No. JCTVC-Q0031-v3, Mar. 28, 2014 (Mar. 28, 2014), XP030115916, pp. 1-19.

\* cited by examiner

UNIFIED INTRA-BLOCK COPY AND INTER-PREDICTION

RELATED APPLICATIONS

This application claims the benefit of U.S. Provisional Application No. 62/040,985 filed on Aug. 22, 2014, which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra picture) prediction and/or temporal (inter picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra coded (I) slice of a picture are encoded using spatial prediction with respect to reference samples in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in use of a predictive block for coding a current block. Residual data represents pixel differences between the original block to be coded and the predictive block. For instance, each respective sample of a block of residual data may be equal to a difference between a respective sample of the original block and a corresponding respective sample of the predictive block. An inter coded block is encoded according to a motion vector that points to a block of reference samples forming the predictive block. An intra coded block is encoded according to an intra coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for intra block-copy prediction. In particular, this disclosure describes various techniques for implementing a unified intra-block copy and inter-prediction scheme. For instance, a video coder may decode or encode a current block of video data of a current picture by determining a co-located block of a reference picture with the co-located block being co-located with the current block of the current picture. The video coder may derive a temporal motion vector predictor from the co-located block and may determine the temporal motion vector predictor has sub-pixel precision. Upon determining the temporal motion vector predictor has sub-pixel precision, the video coder may right-shift the temporal motion vector predictor. Right shifting the temporal motion vector predictor may remove the least significant bit(s) representing the sub-pixel accuracy of the temporal motion vector, effectively converting the temporal motion vector from having a sub-pixel level of precision to having an integer pixel level of precision. Since intra block copy mode uses integer level pixel precision, converting the temporal motion vector predictor may increase coding efficiency because the video coder may use a temporal motion vector that may otherwise be unusable or inefficient for intra block copy mode due to the sub-pixel precision. After right-shifting the temporal motion vector predictor, the video coder may determine, based on the right-shifted temporal motion vector predictor, a predictive block within the current picture.

In one example, this disclosure describes a method of decoding video data using intra block copy mode comprises including a current picture and a reference picture in a reference picture list, the reference picture being different from the current picture; determining a co-located block of the reference picture, the co-located block being co-located with a current block of the current picture; deriving a temporal motion vector predictor from the co-located block; determining the temporal motion vector predictor has sub-pixel precision; right-shifting the temporal motion vector predictor determined to have sub-pixel precision; determining, based on the right-shifted temporal motion vector predictor, a predictive block within the current picture; and forming a decoded video block by summing samples of a residual block and corresponding samples of the predictive block.

In another example, this disclosure describes a method of encoding video data using intra block copy mode comprises including a current picture and a reference picture in a reference picture list, the reference picture being different from the current picture; determining a co-located block of the reference picture, the co-located block being co-located with a current block of the current picture; deriving a temporal motion vector predictor from the co-located block; determining the temporal motion vector predictor has sub-pixel precision; right-shifting the temporal motion vector predictor determined to have sub-pixel precision; determining, based on the right-shifted temporal motion vector predictor, a predictive block within the current picture; and generating residual data representing differences between the predictive block that was determined based on the right-shifted temporal motion vector predictor and the current block.

In another example, this disclosure describes a device for coding video data using intra block copy mode comprises a memory configured to store video data of a picture; and one or more processors configured to: include a current picture and a reference picture in a reference picture list, the reference picture being different from the current picture; determine a co-located block of the reference picture, the co-located block being co-located with a current block of the current picture; derive a temporal motion vector predictor from the co-located block; determine the temporal motion vector predictor has sub-pixel precision; right-shift the temporal motion vector predictor determined to have sub-pixel precision; and determine, based on the right-shifted temporal motion vector predictor, a predictive block within the current picture.

In another example, this disclosure describes a device for decoding video data using intra block copy mode, the device comprising: a memory configured to store video data of a reference picture; and one or more processors configured to: include a current picture and the reference picture in a reference picture list, the reference picture being different from the current picture; determine a co-located block of the reference picture, the co-located block being co-located with a current block of the current picture; derive a temporal motion vector predictor from the co-located block; determine the temporal motion vector predictor has sub-pixel precision; right-shift the temporal motion vector predictor determined to have sub-pixel precision; determine, based on the right-shifted temporal motion vector predictor, a predictive block within the current picture; and form a decoded video block by summing samples of a residual block and corresponding samples of the predictive block.

In another example, this disclosure describes a device for encoding video data using intra block copy mode, the device comprising: a memory configured to store video data of a reference picture; and one or more processors configured to: include a current picture and the reference picture in a reference picture list, the reference picture being different from the current picture; determine a co-located block of the reference picture, the co-located block being co-located with a current block of the current picture; derive a temporal motion vector predictor from the co-located block; determine the temporal motion vector predictor has sub-pixel precision; right-shift the temporal motion vector predictor determined to have sub-pixel precision; determine, based on the right-shifted temporal motion vector predictor, a predictive block within the current picture; and generate residual data representing differences between the predictive block that was determined based on the right-shifted temporal motion vector predictor and the current block.

In another example, this disclosure describes an apparatus for coding video data using intra block copy mode comprises means for including a current picture and a reference picture in a reference picture list, the reference picture being different from the current picture; means for determining a co-located block of the reference picture, the co-located block being co-located with a current block of the current picture; means for deriving a temporal motion vector predictor from the co-located block; means for determining the temporal motion vector predictor has sub-pixel precision; means for right-shifting the temporal motion vector predictor determined to have sub-pixel precision; and means for determining, based on the right-shifted temporal motion vector predictor, a predictive block within the current picture.

In another example, this disclosure describes a non-transitory computer-readable storage medium having instructions stored thereon that, when executed, cause one or more processors of a computing device configured to: include a current picture and a reference picture in a reference picture list, the reference picture being different from the current picture; determine a co-located block of the reference picture, the co-located block being co-located with a current block of the current picture; derive a temporal motion vector predictor from the co-located block; determine the temporal motion vector predictor has sub-pixel precision; right-shift the temporal motion vector predictor determined to have sub-pixel precision; and determine, based on the right-shifted temporal motion vector predictor, a predictive block within the current picture.

The details of one or more examples are set forth in the accompanying drawings and the description below. Other features, objects, and advantages will be apparent from the description, drawings, and claims.

DETAILED DESCRIPTION

Figure 1:
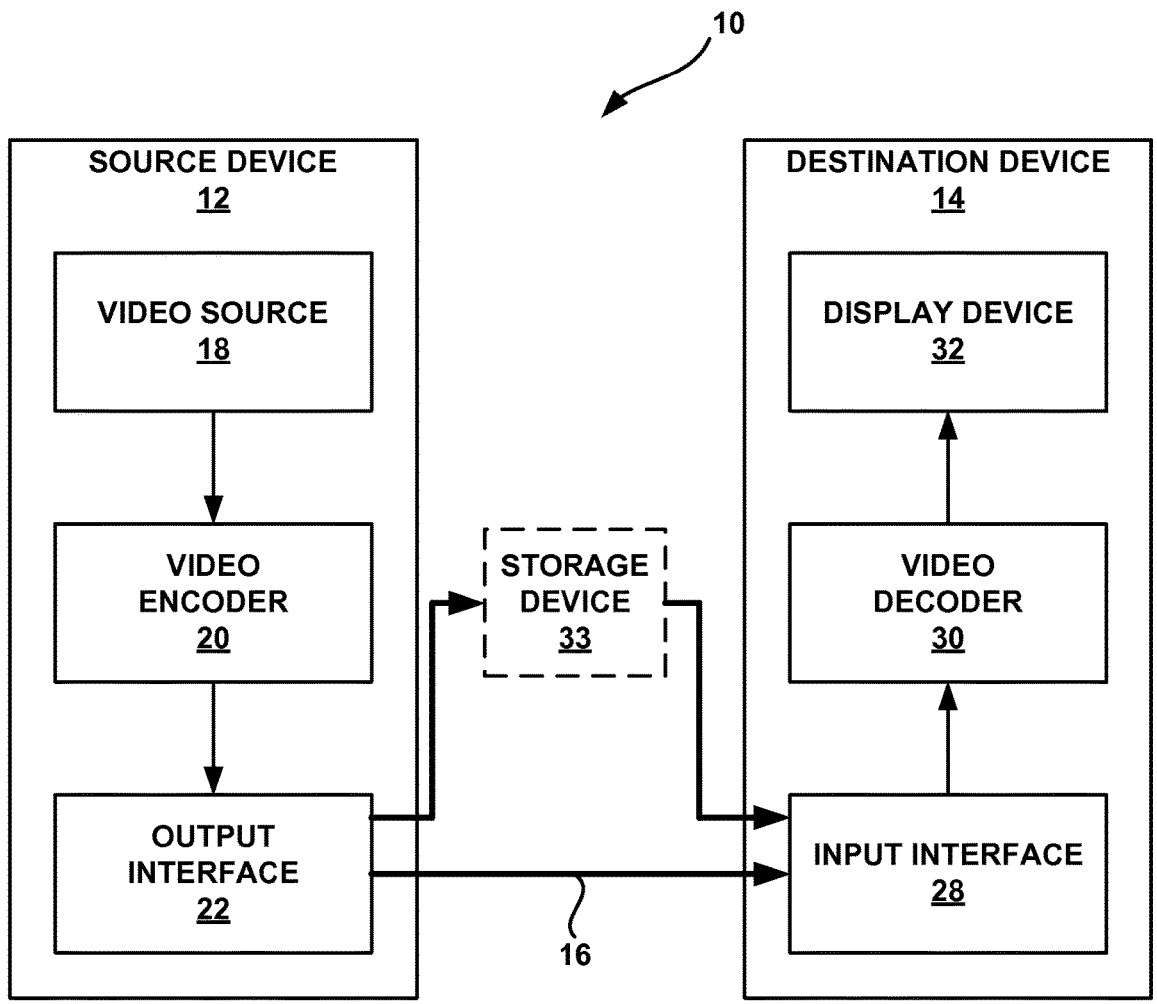
FIG. 1 is a block diagram illustrating an example video encoding and decoding system that may utilize the techniques described in this disclosure.

Aspects of this disclosure are directed to techniques for video encoding and video decoding. For example, a video coder may derive a temporal motion vector predictor while performing advanced motion vector prediction (AVMP). In turn, a video coder may right-shift the temporal motion vector predictor to remove any sub-pixel accuracy. Since intra block copy mode uses integer pixel precision, converting the temporal motion vector predictor may increase coding efficiency because the video coder may use a temporal motion vector predictor that may otherwise be unusable or inefficient for intra block copy mode due to the sub-pixel precision. Aspects of this disclosure may be directed to techniques for improving block vector coding for intra Block Copy (BC). Aspects of this disclosure may be directed to techniques for performing intra BC as part of a unified inter-prediction process for video encoding and video decoding. The techniques described herein may be applied for screen content coding (SCC) or other content where one or more traditional coding tools are inefficient.

Inter prediction is a technique of predicting data elements based on data elements of pictures other than the current picture. For example, a video encoder may use inter prediction to determine a predictive block for a prediction unit (PU) of a current picture. The predictive block is a block of samples based on samples in a reference picture (i.e., a picture other than the current picture). A motion vector of the PU may indicate a spatial displacement between the prediction block of the PU and the predictive block. In this example, the video encoder may generate residual data (i.e., a prediction error) indicating a difference between the predictive block and a prediction block of the PU. The video encoder may include data representative of residual data in a bitstream that contains a coded representation of the video data. A video decoder may use the motion vector to determine the predictive block. Subsequently, the video decoder may sum corresponding samples of the residual data and predictive block to reconstruct the prediction block.

In another example of inter prediction, a video coder may determine a motion vector of a current PU of a current picture based on a temporal motion vector predictor (TMVP) in a reference picture. In many examples, the TMVP is a motion vector of a PU having a prediction block that is at least partially co-located with the prediction block of the PU. For instance, the video coder may adopt the TMVP as a motion vector of the current PU or determine a motion vector of the PU based on the motion vector of the TMVP. The video coder may then use the motion vector of the current PU to determine a predictive block.

Intra prediction is a technique of predicting data elements based on data elements, such as sample values, of the same decoded slice. Intra block copy (i.e., intra BC) is a newly developed form of intra prediction used to encode video blocks, such as coding units (CUs) or PUs. To encode a current video block of a current picture using intra BC, a video encoder searches a search region within the same slice of the current picture as the current video block for a predictive block. In some examples, the predictive block may be a block comprising an array of samples that most closely match an array of samples of the current video block. The video encoder generates a block vector indicating a displacement between the current video block and the predictive block. In much the same manner as inter prediction, the video encoder may use the predictive block to generate residual data. A video decoder may use the block vector of the current video block to determine the predictive block in the current picture. The video decoder may sum corresponding samples of the residual data and predictive block to reconstruct the prediction block of the current video block.

In general, motion vectors used for inter prediction have sub-pixel accuracy. For instance, a motion vector used for inter prediction may have half-pixel or quarter-pixel accuracy. Thus, a motion vector used for inter prediction may indicate a location between two actual pixels of a picture. The actual pixels of a picture may be referred to as integer-pixels because the actual pixels are assigned integer coordinates in an array of pixels of the picture. In instances where a motion vector indicates a location between two integer-pixels, a video coder (i.e., a video encoder or a video decoder) may interpolate the values of samples. In contrast, block vectors used for intra BC are limited to integer accuracy (i.e., integer precision, integer-pixel precision). Thus, the block vectors used for intra BC do not indicate locations between integer-pixels.

Because of the similarities between inter prediction and intra BC, there have been proposals that attempt to unify inter prediction and intra BC. In some such attempts, a video coder generates a reference picture list. Conventionally, the reference picture list is a list of pictures available to be used by a current picture for inter prediction. Several proposals to unify inter prediction and intra BC suggest including the current picture in the reference picture list so that the current picture can be used in the same manner as other reference pictures.

However, several problems emerge in such proposals. For example, a video encoder may determine that the use of intra BC results in the best rate-distortion metric for a current block when a TMVP, which may be a motion vector or a block vector, is used as the block vector of the current block. Hence, in this example, the video encoder may signal a candidate index identifying the TMVP and may signal a reference index indicating a position of the current picture in a reference picture list. The video encoder may also signal a motion vector difference (MVD) indicating a difference, if any, between the block vector of the current block and the TMVP (i.e., a motion vector or block vector of the co-located block). However, if the TMVP happens to be a motion vector of sub-pixel accuracy, the motion vector may not be used for intra BC or is inefficient for the use of intraBC because intraBC has integer precision block vectors. The difference in accuracy (i.e., sub-pixel precision versus integer pixel precision) between inter prediction and intra BC also means that these two modes of prediction operate differently because inter prediction operates using sub-pixel precision and intra BC operates using integer pixel precision. The result is an incompatibility undermining the rationale for unifying inter prediction and intra BC.

Particular techniques of this disclosure provide solutions to such problems. For example, a video coder may include a current picture and a reference picture in a reference picture list. Furthermore, the video coder may determine a co-located block of the reference picture. The co-located block is co-located with a current block of the current picture. A block may be co-located with another block if the blocks correspond to at least partially overlapping positions within the respective blocks of the blocks. Additionally, in this example, the video coder may derive a TMVP from the co-located block. The video coder may then determine whether the TMVP has sub-pixel precision. Responsive to determining the TMVP has sub-pixel precision, the video coder may right-shift the TMVP. In other words, the video coder may right-shift values indicating the TMVP such that any bits (e.g., the two least significant bits) representing the fractional portions of the TMVP are eliminated, resulting in a TMVP having an integer level of precision. For example, if two least significant bits were removed, that would equate to right-shifting by two. As another example, right-shifting a TMVP having quarter pixel accuracy in HEVC by two would convert the TMVP from having sub-pixel accuracy (or quarter-pixel accuracy in this example) to having integer-pixel accuracy). In this way, the video coder may effectively convert the TMVP from sub-pixel accuracy to integer-pixel accuracy. Furthermore, in this example, the video coder may determine, based on the right-shifted temporal motion vector predictor, a predictive block within the current picture and form a decoded video block by summing samples of a residual block and corresponding samples of the predictive block. Thus, by converting the TMVP from sub-pixel precision to integer precision, the video coder may be able to use the TMVP as a block vector for use in intra BC. In this way, this technique of the disclosure may facilitate unification of inter prediction and intra BC.

FIG. 1 is a block diagram illustrating an example video encoding and decoding system 10 that may utilize one or more techniques of this disclosure. As used herein, the term "video coder" refers generically to both video encoders and video decoders. Similarly, in this disclosure, the terms "video coding" or "coding" refers generically to video encoding or video decoding. As set forth throughout this disclosure, video encoder 20 and video decoder 30 of video coding system 10 represent various examples of encoders and decoders that may be configured to perform one or more techniques of this disclosure.

As shown in the example of FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. Source device 12 and destination device 14 may comprise any of a wide range of devices, including desktop computers, notebook (i.e., laptop) computers, tablet computers, set-top boxes, wireless communication devices, telephone handsets such as so-called "smart" phones, so-called "smart" pads, televisions, cameras, display devices, digital media players, video gaming consoles, video streaming device, or the like. In some examples, source device 12 and destination device 14 are equipped for wireless communication.

Destination device 14 may receive encoded video data from source device 12 via a link 16. Link 16 may comprise one or more media or devices capable of moving the encoded video data from source device 12 to destination device 14. In one example, link 16 comprises one or more communication media that enable source device 12 to transmit encoded video data directly to destination device 14 in real-time. In this example, source device 12 modulates or communicates encoded video data according to a communication standard, such as a wireless or wired communication protocol, and transmits the modulated (or unmodulated) video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In some examples, encoded data is output from output interface 22 to a storage device 33. In such examples, encoded data is accessed from storage device 33 by input interface 28. Storage device 33 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

Storage device 33 may comprise a file server or another intermediate storage device that may hold the encoded video generated by source device 12. Destination device 14 may access stored video data from storage device 33 via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive.

Destination device 14 may access the encoded video data through any standard data connection, including an Internet connection. Example types of data connections may include a wireless channel (e.g., a Wi-Fi connection), a wired connection (e.g., DSL, cable modem, etc.), or a combination of both that is suitable for accessing encoded video data stored on a file server. The transmission of encoded video data from storage device 33 may be a streaming transmission, a download transmission, or a combination of both.

The techniques of this disclosure for unified intra-block copy and inter-prediction are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 is configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, video encoder 20 and an output interface 22. In some examples, output interface 22 includes a modulator/demodulator (modem) and/or a transmitter. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. In one example where video source 18 is a video camera, source device 12 and destination device 14 form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 33 for later access by destination device 14 or other devices, for decoding and/or playback.

Destination device 14 includes an input interface 28, a video decoder 30, and a display device 32. In some examples, input interface 28 includes a receiver and/or a modem. Input interface 28 of destination device 14 receives the encoded video data over link 16. The encoded video data communicated over link 16, or provided on storage device 33, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Video encoder 20 and video decoder 30 may operate according to a video coding standard, such as the recently-finalized High Efficiency Video Coding (HEVC), as well as the HEVC Range Extension standard, developed by the Joint Collaborative Team on Video Coding (JCT-VC). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. However, the techniques of this disclosure are not limited to any particular coding standard. Other examples of video coding standards include MPEG-2 and ITU-T H.263.

A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which, as of Aug. 30, 2013, is downloadable from: http://phenix.int-evry.fr/jct/doc_end_user/documents/12_Geneva/wg11/JCTVC-L1003-v34.zip. Another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, April 2013, which as of Aug. 30, 2013, is available from: http://phenix.int-evry.fr/jct/doc_end_user/documents/13_Incheon/wg11/JCTVC-M0432-v3.zip.

Another recent HEVC text specification draft is described in HEVC draft specification, and referred to as HEVC WD hereinafter, is available from http://phenix.int-evry.fr/jct/doc_end_user/documents/15_Geneva/wg11/JCTVC-O1003-v2.zip. Wang et al., "High Efficiency Video Coding (HEVC) Defect Report 4", Joint Collaborative Team on Video Coding (JCT-VC) of ITU-T SG16 WP3 and ISO/IEC JTC1/SC29/WG11, 17$^{th}$ Meeting, Valencia, ES, 27 Mar.-4 Apr. 2014, document: JCTVC-Q1003 (hereinafter, "JCTVC-Q1003") also describes the HEVC standard.

Video encoder and video decoder 30 each represents an example of a video coder configured to perform any combination of the techniques described in this disclosure. In some examples, one or more techniques described herein are configured for use with one or more video coding standards. Example video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. High Efficiency Video Coding (HEVC) is a new video coding standard developed by the Joint Collaboration Team on Video Coding (JCT-VC) of ITU-T Video Coding Experts Group (VCEG) and ISO/IEC Motion Picture Experts Group (MPEG). The HEVC standardization efforts are/were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra prediction encoding modes, the HM may provide as many as thirty-three intra prediction encoding modes.

Although not shown in FIG. 1, in some examples, video encoder 20 and video decoder 30 are each integrated with an audio encoder and an audio decoder, and may include appropriate MUX-DEMUX units, or other hardware and software, to handle encoding of both audio and video in a common data stream or separate data streams. If applicable, in some examples, MUX-DEMUX units conform to the ITU H.223 multiplexer protocol or other protocols, such as the user datagram protocol (UDP).

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

A video sequence typically includes a series of video frames or pictures. For example, a group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other examples, a picture may be monochrome and may only include an array of luma samples.

To generate an encoded representation of a picture, video encoder 20 may generate a set of coding tree units (CTUs). Each respective CTU may be a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). Syntax data within a bitstream may define a size for the CTUs.

In HEVC, the largest coding unit in a slice is called a coding tree block (CTB). A CTB contains a quad-tree the nodes of which are coding units. The size of a CTB can be ranges from 16×16 to 64×64 in the HEVC main profile (although technically 8×8 CTB sizes can be supported). Each CU is coded with one mode.

A video frame or picture may be partitioned into one or more slices. A slice may include an integer number of CTUs ordered consecutively in a coding order, such as a raster scan order.

Each CTU may be split into one or more coding units (CUs) according to a quadtree. In general, a quadtree data structure includes one node per CU, with a root node corresponding to the CTU. If a CU is split into four sub-CUs, the node corresponding to the CU includes four child nodes, each of which corresponds to one of the sub-CUs. A coding unit (CU) may be the same size of a CTB and may be as small as 8×8.

Each node of the quadtree data structure may provide syntax data for the corresponding CU. For example, a node in the quadtree may include a split flag indicating whether the CU corresponding to the node is split into sub-CUs. Syntax elements for a CU may be defined recursively, and may depend on whether the CU is split into sub-CUs. If a CU is not split further, the CU is referred to as a leaf-CU.

Video encoder 20 may recursively perform quad-tree partitioning on the coding tree blocks of a CTU to divide the coding tree blocks into coding blocks, hence the name "coding tree units." A coding block may be an NxN block of samples. In some examples, a CU comprises a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

A CU has a similar purpose as a macroblock of the H.264 standard, except that a CU does not have a size distinction. A size of the CU corresponds may be square or rectangular in shape. The size of the CU may range from 8×8 pixels up to the size of the treeblock with a maximum of 64×64 pixels or greater. A treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, which may further include one or more prediction units (PUs), or transform units (TUs), in the context of HEVC, or similar data structures in the context of other standards (e.g., macroblocks and sub-blocks thereof in H.264/AVC).

A CU includes one or more prediction units (PUs) and one or more transform units (TUs). Syntax data associated with a CU may describe, for example, partitioning of the CU into one or more PUs. Partitioning modes may differ between whether the CU is skip or direct mode encoded, intra-prediction mode encoded, or inter-prediction mode encoded. A CU may be partitioned such that PUs of the CU may be non-square in shape. Syntax data associated with a CU may also describe, for example, partitioning of the CU into one or more TUs according to a quadtree.

Thus, when a CU is inter coded, it may be further partitioned into two prediction units (PUs) or become just one PU when further partitioning does not apply. When two PUs are present in one CU, the PUs can be half size rectangles or two rectangles with one one-quarter the size of the CU and the other three-quarter the size of the CU. In HEVC, the smallest PU sizes are 8×4 and 4×8. When a CU is inter coded, one set of motion information is present for each PU of the CU. In addition, each PU may be coded with a unique inter-prediction mode to derive the set of motion information.

Video encoder 20 may partition a coding block of a CU into one or more prediction blocks. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that has three separate color planes, a PU may comprise a single prediction block and syntax structures used to predict the prediction block samples.

In general, a PU represents a spatial area corresponding to all or a portion of the corresponding CU, and may include data for retrieving a reference sample for the PU. Moreover, a PU includes data related to prediction. In some examples, a PU is encoded using intra mode or inter mode. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

As an example, HEVC supports prediction in various PU sizes. Assuming that the size of a particular CU is 2N×2N, HEVC supports intra-prediction in PU sizes of 2N×2N or N×N, and inter-prediction in symmetric PU sizes of 2N×2N, 2N×N, N×2N, or N×N. HEVC also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.A transform block may be a rectangular block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In a monochrome picture or a picture that has three separate color planes, a TU may comprise a single transform block and syntax structures used to transform the transform block samples. A TU can be square or non-square (e.g., rectangular) in shape. In other words, a transform block corresponding to a TU may be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU are subdivided into smaller units using a quadtree structure known as a "residual quad tree" (RQT). The leaf nodes of the RQT may be referred to as TUs. Pixel difference values associated with the TUs may be transformed to produce transform coefficients, which may be quantized.

The TUs may be specified using an RQT (also referred to as a TU quadtree structure), as discussed above. For example, a split flag may indicate whether a leaf-CU is split into four TUs. Then, each TU may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU corresponds to the size of the corresponding leaf-CU.

Moreover, TUs of leaf-CUs may also be associated with respective quadtree data structures, referred to as RQTs. That is, a leaf-CU may include a quadtree indicating how the leaf-CU is partitioned into TUs. The root node of a TU quadtree generally corresponds to a leaf-CU, while the root node of a CU quadtree generally corresponds to a treeblock. In general, this disclosure uses the terms CU and TU to refer to leaf-CU and leaf-TU, respectively, unless noted otherwise.

Both PUs and TUs may contain (i.e., correspond to) one or more blocks of samples corresponding to each of the channels of the color space associated with that block. Blocks of the PUs may include samples of a predictive block, and blocks of the TUs may blocks that include residual samples corresponding to the difference between the original block and the predictive block. For blocks associated with a YCbCr color space, blocks of luma samples may correspond to the "Y" channel, and two different channels of chroma blocks may correspond to the Cb and Cr channels, respectively. Following intra-predictive or inter-predictive coding using the PUs of a CU, video encoder 20 or video decoder 30 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 or video decoder 30 may form the TUs including the residual data for the CU, and then transform the TUs to produce transform coefficients for the CU. In other words, video encoder 20 may apply a transform to a transform block for a TU to generate a transform coefficient block for the TU. Video decoder 30 may apply an inverse transform to the transform coefficient block for the TU to reconstruct the transform block for the TU.

Following application of transforms (if any) to produce transform coefficients, video encoder 20 may perform quantization of the transform coefficients. In other words, video encoder 20 may quantize the transform coefficients of a transform coefficient block. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m. Inverse quantization (i.e., dequantization) may increase the bit depths of some or all of the coefficients.

Following quantization, video encoder 20 may scan the transform coefficients, producing a one-dimensional vector from a two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 utilizes a predefined scan order to scan the quantized transform coefficients to produce a serialized vector that can be entropy encoded. In other examples, video encoder 20 performs an adaptive scan. After scanning the quantized transform coefficients to form a one-dimensional vector, video encoder 20 may entropy encode the one-dimensional vector, e.g., according to context-adaptive binary arithmetic coding (CABAC), context-adaptive variable length coding (CAVLC), syntax-based context-adaptive binary arithmetic coding (SBAC), Probability Interval Partitioning Entropy (PIPE) coding or another entropy coding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in variable length coding (VLC) may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

According to the HEVC standard, when using inter- or intra-prediction, motion information may be available to video encoder 20 or video decoder 30. For each block, a set of motion information can be available. A set of motion information may contain motion information for forward and backward prediction directions. The terms forward and backward prediction directions are meant to indicate two prediction directions associated with a bi-directional prediction mode. The terms "forward" and "backward" do not necessarily have a geometric meaning. Rather "forward" and "backward" correspond to reference picture list 0 (RefPicList0) and reference picture list 1 (RefPicList1) of a current picture. When only one reference picture list is available for a picture or slice, only RefPicList0 is available and the motion information of each block of a slice is always forward.

For each prediction direction, the motion information must contain a reference index and a motion vector. The reference index is an index to a particular picture in the reference picture list. In some examples, for simplicity, a video coder assumes that a motion has an associated reference index. A reference index is used to identify a reference picture in the current reference picture list (RefPicList0 or RefPicList1). A motion vector has a horizontal and a vertical component. When a CU is inter-coded, one set of motion information is present for each PU. A video coder uses the inter-prediction mode associated with the PU to derive the set of motion information for that PU.

Picture order count (POC) is widely used in video coding standards to identify a display order of a picture. When multiple coded video sequences are present in a bitstream, pictures with a same value of POC may be closer to each other in terms of decoding order. POC values of pictures are typically used for reference picture list construction, derivation of reference picture set as in HEVC and motion vector scaling.

In the HEVC standard, there are two inter-prediction modes, merge (which includes skip mode, a special case of merge mode) and advanced motion vector prediction (AMVP) modes respectively, for a prediction unit (PU). In either AMVP or merge mode, a video coder maintains a motion vector (MV) candidate list of multiple motion vector predictors. In some examples, the MV candidate list contains up to 5 candidates for the merge mode and only two candidates for the AMVP mode. A video coder generates motion vector(s), as well as reference indices to be used when coding a PU using merge mode by selecting one candidate from the MV candidate list.

For instance, when video encoder 20 signals the motion information of a current PU using merge mode, video encoder 20 may generate a merging candidate list that includes one or more merging candidates. Each of the merging candidates specifies the motion information of a spatial motion vector predictor or a temporal motion vector predictor (i.e., a TMVP). A spatial motion vector predictor may be a PU in the current picture (i.e., the picture that includes the current PU). A TMVP may be a PU in a temporal reference picture (i.e., a picture that occurs at a different time instance from the current picture). A merging candidate that specifies the motion information of a TMVP may be referred to as a "temporal merging candidate."

After generating the merging candidate list, video encoder 20 may select one of the merging candidates and include, in a bitstream, a syntax element that indicates the position, within the merging candidate list, of the selected merging candidate. When video decoder 30 decodes the current PU, video decoder 30 generates the same merging candidate list. Furthermore, video decoder 30 may obtain the syntax element from the bitstream and may use the syntax element to determine the selected merging candidate in the merging candidate list. Video decoder 30 may then use the motion information indicated by the selected merging candidate as the motion information of the current PU. Thus, a merge candidate may contain a set of motion information, e.g., motion vectors corresponding to both reference picture lists (list 0 and list 1) and corresponding reference indices. If a video coder identifies a merge candidate by a merge index, the video coder uses the identified reference pictures for the prediction of the current blocks. The video coder also determines the associated motion vectors for the current blocks.

AMVP mode is similar to merge mode in that video encoder 20 generates a candidate list and selects a candidate from the candidate list. Candidates in an AMVP candidate list may be referred to as motion vector predictor (MVP) candidates. The candidates in the AMVP candidate list may include candidates indicating motion vectors of spatial motion vector predictors and/or a temporal motion vector predictor. When video encoder 20 signals the motion information of a current PU using AMVP mode, video encoder 20 may signal a motion vector difference (MVD) for the current PU and a reference index in addition to signaling a position of the selected MVP candidate in the candidate list. An MVD for the current PU may indicate a difference between a motion vector of the current PU and a motion vector of the selected candidate from the AMVP candidate list. In uni-prediction, video encoder 20 may signal one MVD and one reference index for the current PU. In bi-prediction, video encoder 20 may signal two MVDs and two reference indexes for the current PU. Thus, when coding a block using AMVP, for each potential prediction direction from either list 0 or list 1, a video coder explicitly signals each reference index along with an MVP index according to some examples. The MVP index is an index to the MV candidate list since the AMVP candidate contains only a motion vector. In AMVP mode, a video coder may further refine predicted motion vectors.

Furthermore, when the motion information of a current PU is signaled using AMVP mode, video encoder 30 may obtain, from the bitstream, a MVD for a current PU and a candidate list index. Video decoder 30 may generate the same AMVP candidate list and may determine, based on the indication of the position of the selected MVP candidate in the AMVP candidate list, the selected candidate. Video decoder 30 may recover a motion vector of the current PU by adding a MVD to the motion vector indicated by the selected MVP candidate. That is, video decoder 30 may determine, based at least in part on a motion vector indicated by the selected MVP candidate and the MVD, a motion vector of the current PU. Video decoder 30 may then use the recovered motion vector or motion vectors of the current PU to generate predictive blocks for the current PU.

Figure 2:
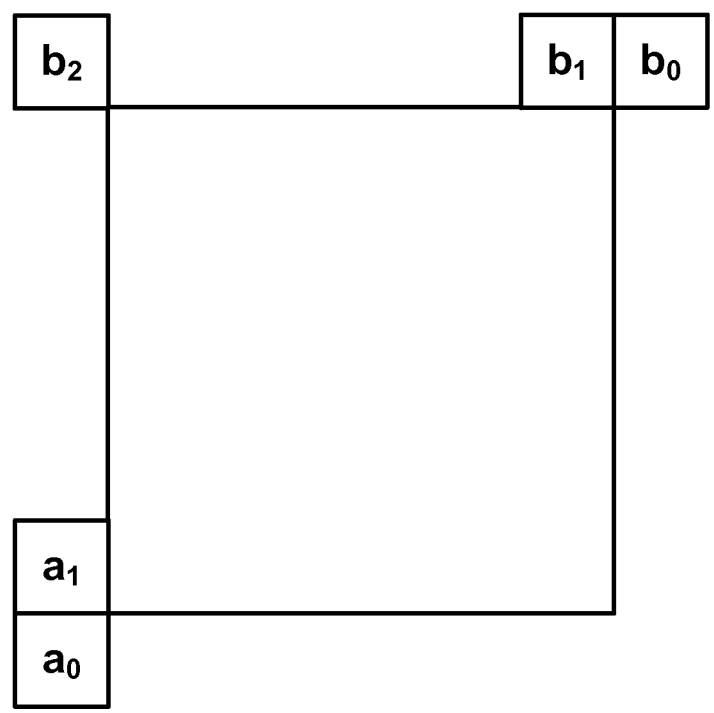
FIG. 2 is a conceptual diagram illustrating motion vector candidates for merge and advanced motion vector prediction (AMVP) modes.

Thus, as described above, a video coder similarly derives candidates for both AMVP and merge modes based on the same spatial and temporal neighboring blocks. However, merge and AMVP modes differ in that a merge candidate corresponds to a full set of motion information while an AMVP candidate contains just one motion vector for a specific prediction direction and a reference index. The candidates for both modes are derived similarly from the same spatial and temporal neighboring blocks. FIG. 2 is a conceptual diagram illustrating spatial motion vector candidates for merge and AMVP modes. That is, FIG. 2 illustrates spatial MV candidates for merge and AMVP modes.

Spatial MV candidates are derived from the neighboring blocks shown in FIG. 2, for a specific PU ($PU_0$), although the methods of generating the candidates from the blocks differ for merge and AMVP modes. For instance, in merge mode, there are five possible spatial MV candidate positions: $\{a_0, a_1, b_0, b_1, b_2\}$, as illustrated in FIG. 2. The video coder determines for each MV candidate position, whether the MV candidate at that position is available. Candidates may not be available if a block at that location has not been decoded yet, as an example. The video coder may check the MV candidate available in the following the order: $\{a_1, b_1, b_0, a_0, b_2\}$.

In AMVP mode, a video coder divides neighboring blocks into two groups: a left group consisting of the block $a_0$ and $a_1$, and an above-neighboring group consisting of the blocks $b_0$, $b_1$, and $b_2$ as shown in FIG. 2. For the left-neighboring group, the video coder checks the availability of the blocks according to the following order in some examples: $\{a_0, a_1\}$. For the above-neighboring group, the video coder checks the availability of the top-neighboring blocks according to the following order in some examples: $\{b_0, b_1, b_2\}$. For each group, a potential candidate that refers to the same reference picture as the picture indicated by the signaled reference index has a highest priority to be chosen by the video coder to form a final candidate of the group. It is possible that no neighboring blocks contain a motion vector that points to the same reference picture. In this case, if the video coder cannot find a motion vector that points to the same reference picture as the pictured indicated by the signaled index, the video coder selects the first available candidate. The video coder scales the first available candidate to form a final candidate. Scaling the candidate motion vector compensates for temporal distance differences in this case.

As described above, a PU or CU may have a luma block of samples, as well as multiple corresponding chroma blocks of samples. In some examples, there may be multiple luma samples that correspond to each chroma sample (referred to as chroma subsampling). In some examples, the motion vector is derived for the luma component of a current PU/CU. In such examples, before the motion vector is used for chroma motion compensation, the motion vector is scaled, based on the chroma sampling format. Thus, when determining a motion vector, a video coder derives a luma motion vector component for a PU or CU first. The video coder may scale the luma motion vector to determine the chroma motion vector based on the chroma subsampling format. For example, the motion vector may be scaled differently depending on whether the current picture is encoded using a 4:4:4, a 4:2:2, or a 4:2:0 format.

Additionally, in HEVC, a video coder may divide an LCU into parallel motion estimation regions (MERs). When an LCU is part of a MER, a video coder allows only neighboring PUs which belong to different MERs from the current PU to be included in the merge/skip MVP list construction process. The video coder signals a size of the MER in a picture parameter set as a syntax element (e.g., "log2_parallel_merge_level_minus2").

In some examples, such as when a MER size is larger than N×N samples, and when a smallest possible CU size is set to 2N×2N samples, a MER may have effects on the availability of a spatially-neighboring block with respect to motion estimation. For example, in the aforementioned case, if a spatially-neighboring block is inside the same MER as a currently PU, a video coder considers the spatially-neighboring block to be unavailable.

Proposals relating to Intra Block Copying (BC) techniques were recently adopted for inclusion in the (HEVC) Range Extensions standard. D. Flynn, et al., "High Efficiency Video Coding (HEVC) Range Extensions text specification: Draft 7", Joint Collaborative Team on Video Coding (JCT-VC) of ITU-T SG 16 WP 3 and ISO/IEC JTC 1/SC 29/WG 11, 17th Meeting: Valencia, ES, 27 Mar.-4 Apr. 2014, document: JCTVC-Q1005_v4 (hereinafter, "JCTVC-Q1005_v4"), available from http://phenix.int-evey.fr/jct/doc_end_user/documents/17_Valencia/wg11/JCTVC-Q1005-v4.zip, is a draft of the HEVC Range Extensions. The Range Extensions to HEVC are also being developed by the JCT-VC.

In this document, the HEVC specification text as in JCTVC-Q1003 may be referred to as "HEVC version 1". The range extension specification may become version 2 of the HEVC. However, in a large extent, as far as the proposed techniques are concerned, e.g., motion vector prediction, HEVC version 1 and the range extension specification are technically similar. Therefore, reference to changes to HEVC version 1 means that the same changes may apply to the range extension specification.

Recently, investigation of new coding tools for screen-content material such as text and graphics with motion began, and investigators have proposed technologies that improve the coding efficiency for screen content. Because there is evidence that significant improvements in coding efficiency can be obtained by exploiting the characteristics of screen content with novel dedicated coding tools, a Call for Proposals (CfP) was issued. The use cases and requirements of this CfP are described in MPEG document N14174. During the 17th JCT-VC meeting, the investigators established an SCC test model (SCM). Joshi et al., "High Efficiency Video Coding (HEVC) Screen Content Coding: Draft 1," Joint Collaborative Team on Video Coding (JCT-VC) of ITU-T SG 16 WP 3 and ISO/IEC JTC 1/SC 29/WG 11, 18th Meeting, Sapporo, J P, 30 Jun.-9 Jul. 2014, document JCTVC-R1005 (hereinafter, "JCTVC-R1005"), which is available from: http://phenix.int-evry.fr/jct/doc_end_user/documents/18_Sapporo/wg11/JCTVC-R1005-v1.zip, is a recent Working Draft (WD) of SCC.

Many applications, such as remote desktop, remote gaming, wireless displays, automotive infotainment, cloud computing, etc., are becoming routine in daily use. Video content in these applications may consist of combinations of natural content, text, artificial graphics, etc. In text and artificial graphics regions, repeated patterns (such as characters, icons, symbols, etc.) often exist. Intra BC is a technique which enables removing the redundancy in coding text and artificial graphics, and improves intra frame coding efficiency, as described in C. Pang, et al., "Non-RCE3 Intra Motion Compensation with 2-D MVs," Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, document JCTVC-N0256 (hereinafter, "JCTVC-N0256").

Intra BC is a technique that enables removing a certain kind of spatial redundancy and improving intra frame coding efficiency. More details concerning intra BC techniques can be found in JCTVC-N0256. The Intra Block Copy (BC) intra-prediction mode has been included in current screen content coding (SCC). An example of Intra BC is shown as in FIG. 3, wherein the current block (e.g., the current CU or PU) is predicted from an already decoded block of the current picture or slice. The prediction signal may be reconstructed without in-loop filtering, including de-blocking and Sample Adaptive Offset (SAO). For the luma component or the chroma components that are coded with Intra BC, the block compensation is done with integer block compensation according to some examples; therefore no interpolation is needed.

Figure 3:
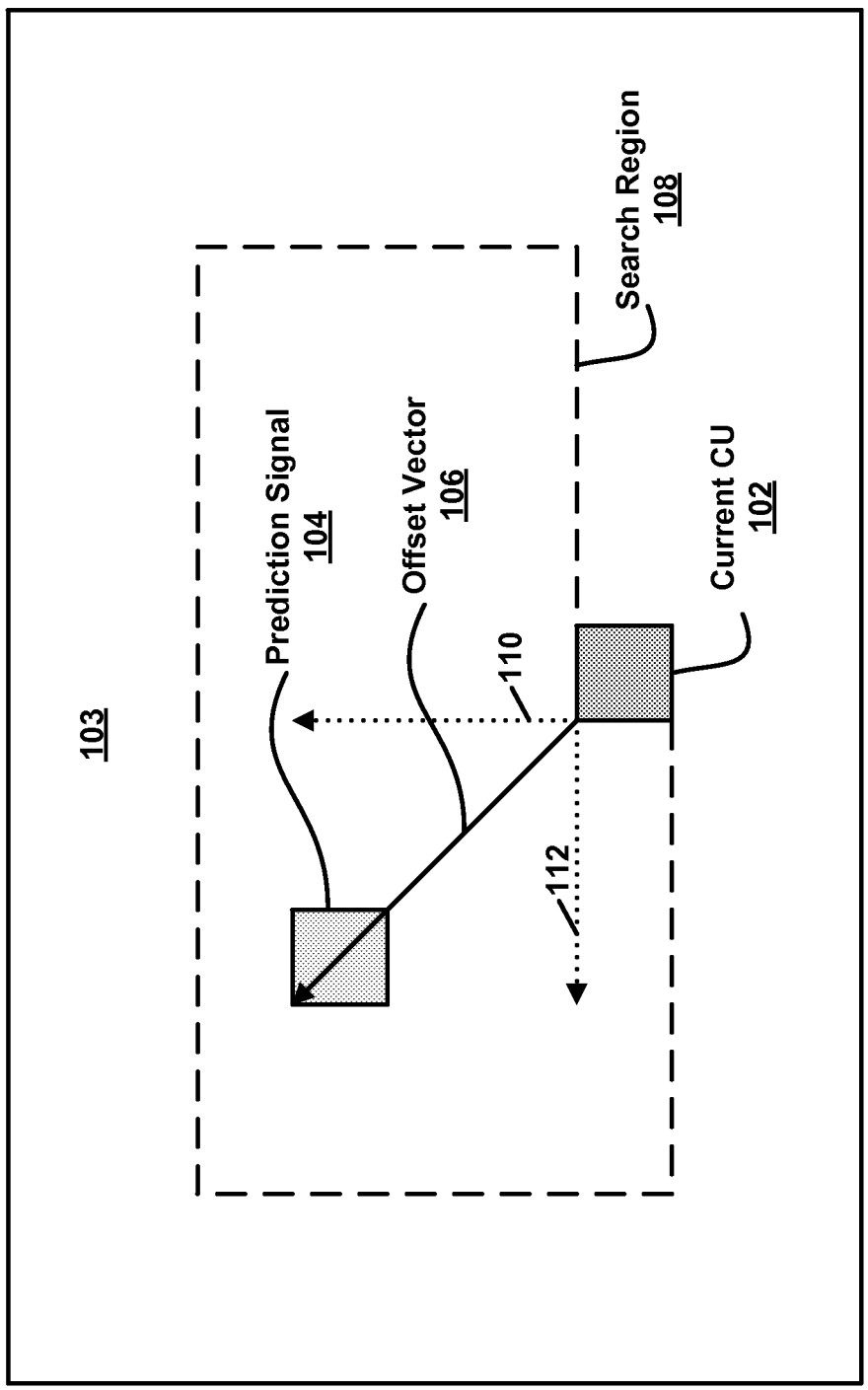
FIG. 3 is a conceptual diagram illustrating an example technique for predicting a current block of video data within a current picture according to an intra BC mode.

FIG. 3 is a conceptual diagram illustrating an example intra block copy technique. In the example of FIG. 3, a current picture 103 includes a current block 102. In some examples, current block 102 is a CU. In other examples, current block 102 is a PU. Furthermore, FIG. 3 illustrates a predictive block 104 (i.e., a prediction signal) within current picture 103. A video coder may use predictive block 104 to predict current video block 102 according to an intra BC mode.

Video encoder 20 determines predictive block 104 from among a set of previously reconstructed blocks of video data. In the example of FIG. 3, search region 108 within picture 103 includes a set of previously reconstructed video blocks. Video encoder 20 may determine predictive video block 104 to predict current block 102 from among the video blocks in search region 108 based on an analysis of the relative efficiency and accuracy of predicting and coding current block 102 based on various video blocks within search region 108.

Video encoder 20 determines a two-dimensional offset vector 106 representing the location or displacement of predictive video block 104 relative to current video block 102. This disclosure may also refer to vectors used in intra block copy as "block vectors." Offset vector 106 includes a horizontal displacement component 112 and a vertical displacement component 110, which respectively represent the horizontal and vertical displacement of predictive block 104 relative to current block 102. Video encoder 20 may include one or more syntax elements that identify or define two-dimensional offset vector 106, e.g., that define horizontal displacement component 112 and vertical displacement component 110, in the encoded video bitstream. Video decoder 30 may decode the one or more syntax elements to determine offset vector 106, and may use the determined vector to identify predictive block 104.

Current block 102 may be a CU, or a PU of a CU. In some examples, a video coder (e.g., video encoder 20 and/or video decoder 30) splits a CU that is predicted according to intra BC into a number of PUs. In such examples, the video coder may determine a respective (e.g., different) two-dimensional offset vector 106 for each of the PUs of the CU. For example, a video coder may split a 2N×2N CU into two 2N×N PUs, two N×2N PUs, or four N×N PUs. As other examples, a video coder may split a 2N×2N CU into ((N2)×N+(3N/2)×N) PUs, ((3N/2)×N+(N/2)×N) PUs, (N×(N/2)+N×(3N/2)) PUs, (N×(3N/2)+N×(N/2)) PUs, four (N/2)×2N PUs, or four 2N×(N/2) PUs. In some examples, video coder predicts a 2N×2N CU using a 2N×2N PU.

When coding a block using intra BC mode, a video coder determines that offset vector 106 has integer-pixel precision for both the luma and chroma components. Using integer-pixel precision for the motion vector avoids interpolation of the reference block to generate a predictive block. A block vector is predicted and signaled with integer-pixel precision. According to JCTVC-R1005, a video coder initially sets a block vector predictor to (−w, 0) at the beginning of each CTB, where "w" is the width of the CU. Using the block vector predictor, a video coder attempts to predict the block vector for current block 102 based on a value of a previously-coded CU or PU coded using intra BC mode.

The video coder updates the block vector predictor after each intra BC CU or PU is coded. If a CU or PU is not coded using intra BC, the video coder does not change the block vector predictor. After determining the block vector predictor for a CU or PU, video encoder 20 determines the difference between the predictor and the actual block vector to determine a block vector difference. Video encoder 20 may encode the block vector difference using the motion vector difference coding method of HEVC.

In some examples, intra BC is enabled at both the CU and PU levels. For PU-level intra BC mode, 2N×N and N×2N PU partition sizes are supported for all CU sizes. When the smallest possible CU has a size of N×N samples, PU partitioning is supported.

A video coder may then treat Intra BC like Inter mode. Furthermore, Bin Li et al., "Non-SCCE1: Unification of intra BC and inter modes," Joint Collaborative Team on Video Coding (JCT-VC) of ITU-T SG 16 WP 3 and ISO/IEC JTC 1/SC 29/WG 11, 18th Meeting: Sapporo, J P, 30 Jun.-9 Jul. 2014, document JCTVC-R0100 (hereinafter, "JCTVC-R0100") proposed a technique for the unification of intra BC and inter modes. In accordance with the technique of JCTVC-R0100, a video coder adds a current picture into a reference picture list. Because the current picture is in the reference picture list, the video coder may use the current picture for Intra BC as a reference picture in the same manner that the video coder would use a temporal reference picture (i.e., a reference picture having a different POC value from a POC value of the current picture). In accordance with the technique of JCTVC-R0100, the video coder marks the current picture as a long-term reference picture before decoding the current picture, and marks the current picture as a short-term reference picture after the decoding of the current picture. Furthermore, in accordance with the technique of JCTVC-R0100, when Intra BC mode is enabled, the video coder follows the syntax parsing process and decoding process of a P-slice for an I-slice. As defined in JCTVC-Q1003, an I-slice is a slice that is decoded using intra prediction only. Furthermore, as defined in JCTVC-Q1003, intra prediction is a prediction derived from only data element (e.g., sample values) of the same decoded slice. As defined in JCTVC-Q1003, a P-slice is a slice that may be decoded using intra prediction or inter prediction using at most one motion vector and reference index to predict the sample values of each block. A B-slice is a slice that may be decoded using intra prediction or inter prediction using at most two motion vectors and reference indices to predict the sample values of each block.

When Intra BC mode is treated as an Inter prediction mode, some issues may exist in the temporal motion vector prediction derivation for AMVP or merge, the interaction with constrained intra prediction, reference list construction, and so on. The techniques of this disclosure improve unification of Intra BC and Inter prediction in the case that the video coder treats Intra BC mode as an Inter-prediction mode. In this case, the video coder adds the current picture to reference list 0 (i.e., reference picture list 0). Although Intra BC mode is similar to Inter-prediction mode, a video coder may determine whether a block is Intra BC-coded versus Inter-mode-coded by checking whether the reference picture associated with the current block is the current picture (i.e. reference picture has same POC value as current picture). If the reference picture of the block is the current picture, the block is of Intra BC mode. Otherwise, the current block is coded using conventional Inter-prediction mode. Various examples in accordance with the techniques of this disclosure are described herein. Each of the following examples may apply separately or jointly with one or more of the others.

In some examples, when the video coder (e.g., video encoder 20 and/or video decoder 30) adds the current picture to reference list 0, the video coder marks the current reference picture as a long-term before the decoding of current picture. In this case, the video coder may code the block vector for Intra BC mode using integer-pixel precision or sub-pixel precision, such as quarter-pixel precision as described in the HEVC standard. When the video coder uses temporal motion vector prediction for a block and the video coder codes a motion vector for Intra BC with integer-pixel precision, the video coder may use a temporal motion vector predictor (TMVP) for Intra BC mode, AMVP mode, or merge mode, with integer-pixel precision. The video coder may use a TMVP with integer pixel precision when the collocated block is an Intra BC block or with sub-pixel precision when the collocated block is conventional Inter block.

In some examples, a video coder may determine that the TMVP has sub-pixel precision. In this case, the video coder may right-shift the motion vector first and then use the resulting right-shifted motion vector as the TMVP. For example, the video coder may right-shift binary values of the TMVP such that any bits (e.g., the two least significant bits) representing the fractional portions of the TMVP are eliminated, resulting in a TMVP having an integer level of precision. In other words, the video coder may determine the TMVP has sub-pixel precision and right-shift the TMVP determined to have sub-pixel precision. In this example, right-shifting the TMVP converts the TMVP from sub-pixel prediction to integer-pixel precision, thereby making the TMVP usable or efficient for intra BC mode coding of the current block. In another example, the video coder may use the TMVP motion vector without right-shifting the motion vector, regardless of whether motion vector precision is integer precision or sub-pixel precision. By using the TMVP motion vector without performing any right-shifting, the video coder interprets the sub-pixel accuracy motion vector as a motion vector having integer-pixel accuracy.

Thus, in examples of this disclosure where the video coder performs a coding process that involves right-shifting the TMVP, the video coder determines a co-located block of video data of a reference picture different from the current picture. Furthermore, in such examples, the video coder may derive a TMVP from the co-located block of video data. The video coder may right-shift the TMVP. The video coder may code a current block of video data of the current picture using intra block copy mode and the right-shifted temporal motion vector predictor. As part of this coding process, the video coder may determine whether the co-located block of video data is intra BC mode encoded or inter prediction mode encoded. Because video blocks coded using intra BC mode have integer-pixel precision motion vectors and video blocks coded using inter prediction have sub-pixel precision motion vectors, the video coder may be able to determine, based on whether a video block is coded using intra BC mode or inter prediction, whether the TMVP has sub-pixel precision or integer-pixel precision. Thus, the video coder may be configured to right-shift the TMVP only in response to determining that the co-located block of video data is inter-prediction mode encoded.

In some examples, video encoder 20 and/or video decoder 30 may determine whether the temporal motion vector predictor has integer-pixel precision or sub-pixel precision. Sub-pixel precision may also be referred to as fractional pixel precision or non-integer pixel precision. Video encoder 20 and/or video decoder 30 may be configured to right-shift the temporal motion vector predictor only in response to determining that the temporal motion vector predictor has sub-pixel precision.

As indicated above, a video coder may right-shift the TMVP to convert the TMVP from having sub-pixel precision to having an integer-pixel precision. For example, the video coder may right shift the TMVP to remove the sub-pixel accuracy thereby converting the pixel accuracy of the TMVP from sub-pixel precision to integer-pixel precision. For example, the TMVP may initially have values (3.25, −3.5) for the horizontal and vertical components, meaning the motion vector indicates a location 3.25 pixels right and 3.5 pixels above the current block. In this example, right shifting to remove the sub-pixel accuracy results in the TMVP having the values of (3, −3) for the horizontal and vertical components, meaning the motion vector indicates a location 3 pixels right and 3 pixels above the current block. By converting a temporal motion vector predictor that has an integer level of precision, interpolation of the reference block to generate a predictive block may be avoided.

As another example, video decoder 30 may be configured to receive an intra block copy mode encoded block of video data of a current picture. Video decoder 30 may determine a co-located block of video data of a reference picture that is different from the current picture. Video decoder 30 may derive a temporal motion vector predictor from the co-located block of video data. Video decoder 30 may right-shift the TMVP. Video decoder 30 may determine a predictive block in the current picture based on the right-shifted TMVP. Video decoder 30 may decode the block of video data of the current picture using the right-shifted temporal motion vector predictor.

As another example, video decoder 30 may be configured to include a current picture and a reference picture in a reference picture list with the reference picture being different from the current picture. Furthermore, in this example, video decoder 30 determines a co-located block of the reference picture. The co-located block is co-located with a current block of the current picture. Video decoder 30 may derive a temporal motion vector predictor from the co-located block. For example, video decoder 30 may determine that the TMVP is equal to (−5.25, 4.00), the values of which being identified by a binary representation with the sub-pixel accuracy values corresponding to, for example, the two least significant bits of the binary representation. Video decoder 30 may be configured to determine the TMVP has sub-pixel precision. In some examples, video decoder 30 determines the TMVP has sub-pixel precision by determining whether the co-located block of video data is intra block copy mode encoded or inter prediction mode encoded. A determination that the co-located block of video data is inter prediction mode encoded may mean that the co-located block of video data has sub-pixel precision (e.g., non-integer precision or fractional precision).

In this example, responsive to determining the TMVP has sub-pixel precision, video decoder 30 right-shifts the TMVP. In some examples, video decoder 30 only right-shifts the TMVP upon determining that the co-located block is inter prediction mode encoded. Video decoder 30 may be configured to determine, based on the right-shifted TMVP, a predictive block within the current picture. For instance, in the example of FIG. 3, video decoder 30 may use the right-shifted TMVP to determine prediction signal 104. Video decoder 30 may generate residual data based on the predictive block that was determined based on the right-shifted temporal motion vector predictor.

As another example, video encoder 20 may be configured to include a current picture and a reference picture in a reference picture list with the reference picture being different from the current picture. Video encoder 20 may be configured to determine a co-located block of a reference picture of the video data, the co-located block being co-located with a current block of the current picture, the reference picture being different from the current picture. Video encoder 20 may be configured to derive a temporal motion vector predictor from the co-located block. Video encoder 20 may be configured to determine the temporal motion vector predictor has sub-pixel precision. For example, video encoder 20 may be configured to determine the temporal motion vector predictor has sub-pixel precision by being configured to determine whether the co-located block of video data is intra block copy mode encoded or inter prediction mode encoded. A determination that the co-located block of video data is inter prediction mode encoded may mean that the co-located block of video data has sub-pixel precision (e.g., non-integer precision or fractional precision).

Video encoder 20 may be configured to right-shift the temporal motion vector predictor determined to have sub-pixel precision. In some examples, video encoder 20 may be configured to only right-shift the temporal motion vector predictor upon determination that the co-located block is inter prediction mode encoded. Video encoder 20 may be configured to determine, based on the right-shifted temporal motion vector predictor, a predictive block within the current picture. Video encoder 20 may be configured to generate residual data based on the predictive block.

Furthermore, in some examples of this disclosure, for I-slices, a video coder derives the initType value. The initType value indicates a context type, which the video coder uses to determine how a syntax element is CABAC-coded. The initType value may depend on the value of initType may further depend on the cabac_init_flag syntax element. As defined in JCTVC-Q1003, the cabac_init_flag syntax element specifies a method for determining an initialization table used in an initialization process for context variables. The video coder may use the initType value to determine the value of the ctxIdx value, which may indicate a CABAC context. In one example in accordance with the techniques of this disclosure, the derivation of initType is modified as follows in the following pseudocode:

---
Code Section 1: initType Derivation
---
```
if( slice_type == I && !intra_block_copy_enabled_flag )
    initType = 0
else if (slice_type == I && intra_block_copy_enabled_flag )
    initType = cabac_init_flag ? 2 : 1
else if( slice_type == P )
    initType = cabac_init_flag ? 2 : 1
else
    initType = cabac_init_flag ? 1 : 2
```
---

The preceding code of Section 1 modifies section 9.3.2.2 of the JCTVC-Q1003. Underlined text indicates added text to JCTVC-Q1003. As defined in JCTVC-Q1003, the slice_type syntax element indicates a coding type for a slice. For instance, the slice_type syntax element indicates whether a slice is an I slice, a P slice, or B slice. Furthermore, as defined in JCTVC-R1005, intra_block_copy_enabled flag is a syntax element in a sequence parameter set. The intra_block_copy_enabled flag indicates whether intra BC is enabled for slices in coded video sequences for which the sequence parameter set is active. Thus, in the example of Code Section 1, the initType variable has different values when coding an I slice, depending on whether intra BC is enabled for the I slice.

In another example, a video coder determines the initType value used to CABAC code syntax elements that are not present in the bitstream for an I-slice and not using intra BC, according to Code Section 1. In other words, only for the syntax elements which do not exist for conventional I slice, i.e. without Intra BC, the corresponding variable initType is derived as in Code Section 1. For other syntax elements, the video coder may set the value of initType equal to 0.

In another example, when intra-BC is enabled for a CU or PU, a video coder may allow both intra- and inter-prediction modes in an I-slice. Hence, video decoder 30 may decode a first block of an I slice of a picture using intra prediction and may decoding a second block of the I slice using an intra BC mode. Similarly, video encoder 20 may encode a first block of an I slice of a picture using intra prediction and may encode a second block of the I slice using an intra BC mode. The following pseudocode example illustrates this possibility:

---
Code Section 2: Modification of CUPredMode
---
When pred_mode_flag is not present, the video coder derives the variable CuPredMode[ x ][ y ] as follows for x = x0...x0 + nCbS − 1 and y = y0..y0 + nCbS − 1:
  – If slice_type is equal to I and intra_block_copy_enabled_flag is equal to 0, CuPredMode[ x ][ y ] is inferred to be equal to MODE_INTRA.

The preceding pseudocode modifies Section 7.4.9.5 of JCTVC-Q1003. Underlined text indicates added text to JCTVC-Q1003. As defined in JCTVC-Q1003, pred_mode_flag is a syntax element indicating a prediction mode (e.g., inter prediction (MODE_INTER) or intra prediction (MODE_INTRA)) for a CU. Because prediction modes of CUs can be inferred in some circumstances, a video coder loads the prediction modes into an array variable CuPredMode indexed based on the locations of pixels, rather than merely relying the values of pred_mode_flag. Thus, in Code Section 2, CuPredMode[x][y] indicates a prediction mode of a CU at location (x, y) in a picture. nCbs indicates a size of a coding block of the CU. Hence, in the example of Code Section 2, a video coder is able to infer the value of CuPredMode[x][y] (i.e., the prediction mode of the CU at location (x, y)) is MODE_INTRA when the CU is in an I slice and intra BC is enabled for the I slice. Hence, it is unnecessary for video encoder 20 to signal a pred_mode_flag syntax element for the CU. This may reduce the bit rate of encoded video data.

As another example in which a video coder treats Intra BC as Inter-prediction using the unified techniques of this disclosure, an Intra BC-coded block may share the same candidate list for AMVP or merge modes with an Inter-coded block. In this example, the candidate list may include both Intra BC-coded blocks and Inter-coded blocks. Hence, video encoder 20 and/or video decoder 30 may generate a motion vector candidate list that includes at least one motion vector candidate for an intra block copy mode encoded block and at least one candidate for an inter-prediction mode encoded block. In some examples, an Intra BC block may have a separate candidate list for AMVP or merge from an Inter-coded block. Although the prediction modes are the same, a video coder may differentiate an Intra BC-coded block from a conventional Inter block by checking whether the reference picture for the current block is the current picture.

Furthermore, particular techniques of this disclosure may also enhance unified intra BC and inter-mode by modifying the reference list construction process. The following language and pseudocode modifies the decoding process for reference picture lists construction in Section 8.3.4 of the JCTVC-Q1003 with underlined text indicating added text to JCTVC-Q1003:

This process is invoked at the beginning of the decoding process for each P or B slice or for I-Slice when intra_block_copy_enabled_flag is equal to 1

Reference pictures are addressed through reference indices as specified in clause 8.5.3.3.2 (Reference picture selection process). A reference index is an index into a reference picture list. When decoding a P slice, there is a single reference picture list RefPicList0. When decoding a B slice, there is a second independent reference picture list RefPicList1 in addition to RefPicList0.

Thus, the preceding language serves to allow modification of the reference picture process when intra BC mode is enabled for an I-slice. Hence, in this example, video encoder 20 may construct a reference picture list for an I slice of a picture when intra BC is enabled for the I slice, the reference picture list including the picture. In a similar example, video decoder 30 may obtain, from a bitstream, a syntax element (e.g., intra_block_copy_enabled_flag) indicating whether intra BC is enabled for a picture. In this example, responsive to determining based on the syntax element that intra BC is enabled for the picture, video decoder 30 may construct a reference picture list including the picture.

In one example, when decoding an I-Slice with intra_block_copy_enabled_flag equal to 1, video decoder 30 may use only one reference picture list. In another example, when decoding an I-Slice with intra_block_copy_enabled_flag equal to 1, there may be a second independent reference picture list RefPicList1 in addition to RefPicList0.

In some examples, at the beginning of the decoding process for each slice, the reference picture lists RefPicList0 and, for B slices, RefPicList1 are derived according to the following pseudocode with underlined text indicating added text to JCTVC-Q1003:

---

Code Section 3: Modification of RefPicList0

```
incrementRef = (intra_block_copy_enabled_flag)? 1 : 0
The variable NumRpsCurrTempList0 is set equal to Max(
num_ref_idx_l0_active_minus1 + 1, NumPocTotalCurr) + incremen-
tRef and the list RefPicListTemp0 is constructed as follows:
rIdx = 0
while( rIdx < NumRpsCurrTempList0 ) {
    for( i = 0; i < NumPocStCurrBefore && rIdx <
NumRpsCurrTempList0; rIdx++, i++ )
        RefPicListTemp0[ rIdx ] = RefPicSetStCurrBefore[ i
]
    for( i = 0; i < NumPocStCurrAfter && rIdx <
NumRpsCurrTempList0; rIdx++, i++ )    (8 8)
        RefPicListTemp0[ rIdx ] = RefPicSetStCurrAfter[ i ]
    for( i = 0; i < NumPocLtCurr && rIdx <
NumRpsCurrTempList0; rIdx++, i++ )
        RefPicListTemp0[ rIdx ] = RefPicSetLtCurr[ i ]
    if (incrementRef)
        RefPicListTemp0[ rIdx ] = currPic (8-8)
}
```

---

Thus, the preceding pseudocode modifies the RefPicListTemp0 variable such that RefPicListTemp0[rIdx] is equal to the current picture, where rIdx is the maximum index in the last index in the RefPicListTemp0 array. In some examples, the video coder adds the current picture at the beginning of RefPicListTemp0 or before the long-term reference pictures. In some examples, the video coder adds the current picture to the RefPicListTemp0 based on the slice_type parameter. Thus, in these examples, a video coder may include, in a reference picture list, a current picture before long term pictures in the second reference picture list; or include, in the reference picture list, the current picture at a location in the reference picture list based on whether a slice is an I slice, a P slice, or a B slice. Because smaller-valued reference indexes may be represented using fewer bits, it is desirable to have more frequently used reference pictures have smaller-valued reference indexes. Thus, including the current picture an earlier location in the reference picture list relative to other reference pictures in the reference picture list reflects an assumption that the current picture will be used in intra BC more frequently than the other reference pictures.

As another example, for an example, for an I_slice, the video coder adds the current picture into RefPicListTemp0 at the beginning of RefPicListTemp0, and for a P or B slice at the end of the long term reference pictures. The following pseudocode illustrates this example with underlined text indicating text added to JCTVC-Q1003:

---

Code Section 4: Modification of Reference Picture List Construction

```
while( rIdx < NumRpsCurrTempList0 ) {
    if (incrementRef && Slice_type==I_Slice)
        RefPicListTemp0[ rIdx ] = currPic
```

Code Section 4: Modification of Reference Picture List Construction

```
       for( i = 0; i < NumPocStCurrBefore && rIdx <
NumRpsCurrTempList0; rIdx++, i++ )
            RefPicListTemp0[ rIdx ] = RefPicSetStCurrBefore
[ i ]
       for( i = 0; i < NumPocStCurrAfter && rIdx <
NumRpsCurrTempList0; rIdx++, i++ )       (8-8)
            RefPicListTemp0[ rIdx ] = RefPicSetStCurrAfter[ i ]
       for( i = 0; i < NumPocLtCurr && rIdx <
NumRpsCurrTempList0; rIdx++, i++ )
            RefPicListTemp0[ rIdx ] = RefPicSetLtCurr[ i ]
       if (incrementRef && (slice_type==P_Slice ||
slice_type==B_Slice))
            RefPicListTemp0[ rIdx ] = currPic
```

As an another example, for an I-slice the video coder adds the current picture to RefPicListTemp0 at the beginning, and for a P or B slice adds the current picture before the long term reference pictures. As another example, the location of adding the current picture into RefPicListTemp0 is based on the slice_type of the current picture.

In some examples, a video coder constructs RefPicList0 based on RefPicListTemp0 according to the following pseudocode with underlined text indicating added text to JCTVC-Q1003:

The list RefPicList0 is constructed as follows:

```
for( rIdx = 0; rIdx <= num_ref_idx_l0_active_minus1; rIdx++ )
RefPicList0[ rIdx ] = ref_pic_list_modification_flag_l0 ?
RefPicListTemp0[ list_entry_l0[ rIdx ] ] : RefPicListTemp0[ rIdx ]
(8-9)
```

When the slice is a B slice, the variable NumRpsCurrTempList1 is set equal to Max(num_ref_idx_l1_active_minus1+1, NumPocTotalCurr)+incrementRef and the list RefPicListTemp1 is constructed as follows:

```
rIdx = 0
while( rIdx < NumRpsCurrTempList1 ) {
       for( i = 0; i < NumPocStCurrAfter && rIdx <
NumRpsCurrTempList1; rIdx++, i++ )
            RefPicListTemp1[ rIdx ] = RefPicSetStCurrAfter[ i ]
       for( i = 0; i < NumPocStCurrBefore && rIdx <
NumRpsCurrTempList1; rIdx++, i++ )       (8-10)
            RefPicListTemp1[ rIdx ] = RefPicSetStCurrBefore[ i
]
       for( i = 0; i < NumPocLtCurr && rIdx <
NumRpsCurrTempList1; rIdx++, i++ )
            RefPicListTemp1[ rIdx ] = RefPicSetLtCurr[ i ]
            (8-10)
       if (incrementRef)
            RefPicListTemp1 [ rIdx ] = currPic
}
```

In some examples, similar to the process above for RefPicListTemp1, a video coder may add the current picture into RefPicListTemp1 be based on the slice_type of the current picture according to the following pseudocode and standards language of JCTVC-Q1003, Section 8.3.4 with underlined text indicating added text to JCTVC-Q1003:

When the slice is a B slice, the list RefPicList1 is constructed as follows:

```
for( rIdx = 0; rIdx <= num_ref_idx_l1_active_minus1 ; rIdx++)
       (8-11)
RefPicList1[ rIdx ] = ref_pic_list_modification_flag_l1 ?
```
(8- 11)
RefPicListTemp1[ list_entry_l1[ rIdx ] ] : RefPicListTemp1[ rIdx ]

where currPic is the current decoded picture as in 8.5.3.3.2 and shall have the same temporal ID of the current picture.

In some examples, the reference picture selection process to determine the reference picture indices of Section 8.5.3.3.2 of JCTVC-Q1003 may be modified as follows with underlined text indicating added text to JCTVC-Q1003:
Input to this process is a reference index refIdxLX.
Output of this process is a reference picture consisting of a two-dimensional array of luma samples $refPicLX_L$ and two two-dimensional arrays of chroma samples $refPicLX_{Cb}$ and $refPicLX_{Cr}$.
The output reference picture RefPicListX[refIdxLX] consists of a pic_width_in_luma_samples by pic_height_in_luma_samples array of luma samples $refPicLX_L$ and two PicWidthInSamplesC by PicHeightInSamplesC arrays of chroma samples $refPicLX_{Cb}$ and $refPicLX_{Cr}$.
The reference picture sample arrays $refPicLX_L$, $refPicLX_{Cb}$, and $refPicLX_{Cr}$ correspond to decoded sample arrays $S_L$, $S_{Cb}$, and $S_{Cr}$ derived in clause 8.7 or as in clause 8.7 without in-loop filter (deblocking and SAO) for a previously-decoded picture or current decoded picture.

When both Intra BC and the constrained intra prediction are enabled, the prediction for Intra or Intra BC blocks can only be from Intra blocks or the Inter block with any reference pictures being the current picture. In constrained intra prediction, intra prediction only uses residual data and decoded samples from neighboring coding blocks coded using intra prediction modes. As described in JCTVC-Q1003, a syntax element (e.g., constrained_intra_pred_flag) is signaled in a picture parameter set to indicate whether constrained intra prediction is used in decoding pictures for which the picture parameter set is active. Thus, this example, when both Intra BC and constrained intra prediction are enabled for a slice, a video coder may use inter prediction to determine a block vector of a block of the slice based on a block vector or motion vector of a block in a different picture.

JCTVC-Q1003 defines a cu_skip_flag syntax element. In accordance with an example of this disclosure, the semantics of the cu_skip_flag defined in JCTVC-Q1003 are changed as follows:
cu_skip_flag[x0][y0] equal to 1 specifies that for the current coding unit, when decoding a P or B slice or I-Slice with intra_block_copy_enabled_flag equal to 1, no more syntax elements except the merging candidate index merge_idx[x0][y0] are parsed after cu_skip_flag [x0][y0].

Thus, in this example, when cu_skip_flag is 1 for a current CU in an I slice in which intra BC is enabled, video encoder 20 does signal a merge flag syntax element, MVD syntax elements, motion vector predictor flag syntax elements, or inter prediction direction syntax elements. Additionally, when cu_skip_flag is 1 for a current CU in an I slice in which intra BC is enabled, video encoder 20 does not signal a transform tree for the current CU. Rather, the video coder takes a predictive block indicated by the motion information of the merging candidate indicated by the merging candidate index to be the reconstructed coding block of the current CU.

QCTVC-Q1003 defines a slice temporal_mvp_enabled_flag in a slice segment header. The slice_temporal_mvp_enabled_flag specifies whether temporal motion vector predictors can be used for inter prediction. When slice_temporal_mvp_enabled_flag is equal to 0 in an I slice when intra_block_copy_enabled_flag equal to 0, it has no impact on the normative decoding process of the picture but merely expresses a bitstream constraint.

While the techniques of this disclosure related to techniques unified intra-block copy and inter-prediction are described with regard to HEVC, the techniques of this disclosure are not limited to HEVC, and may be applicable in any video coding system in which inter-prediction and intra BC, or their analogues, are used.

Figure 4:
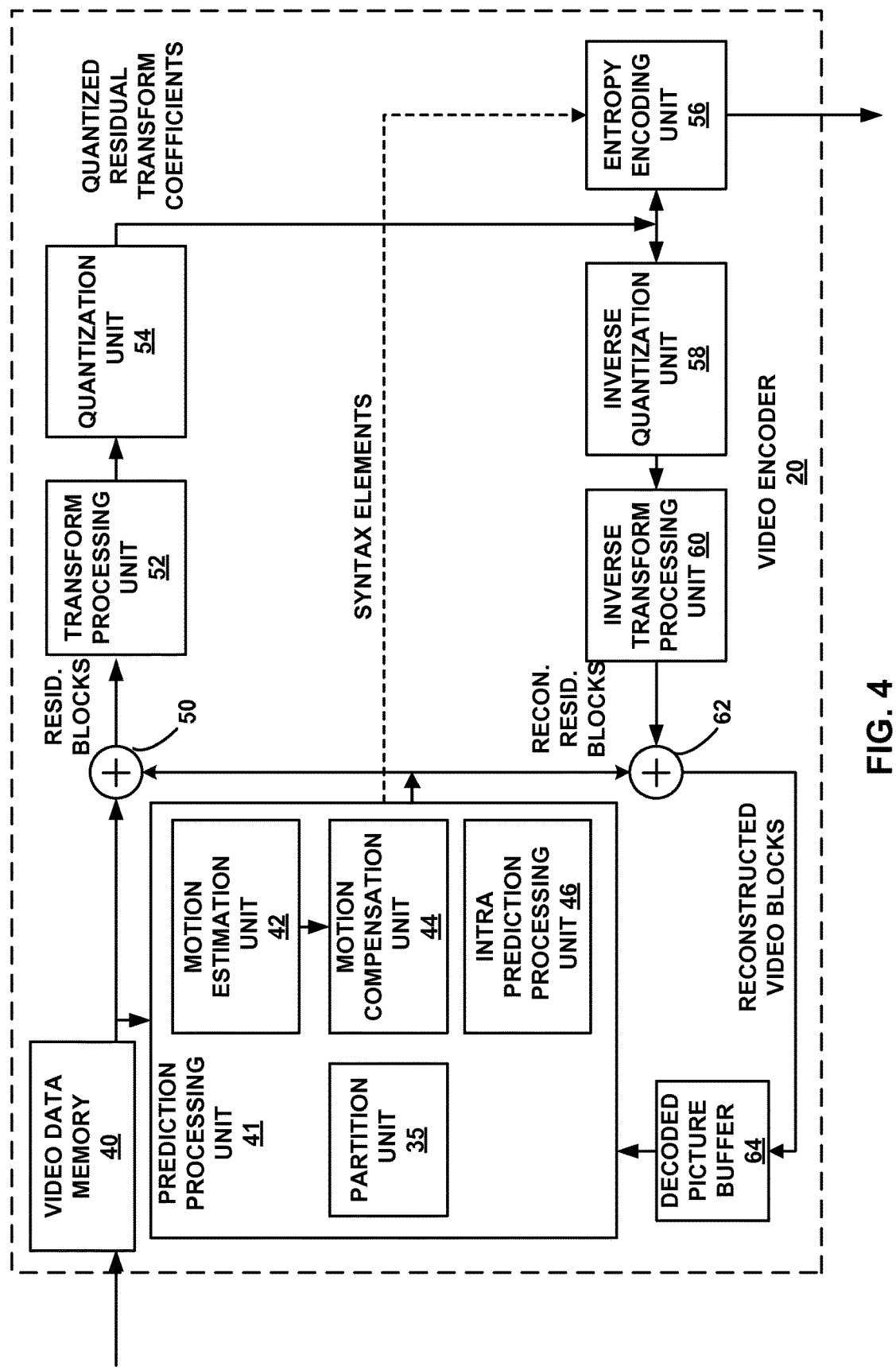
FIG. 4 is a block diagram illustrating an example video encoder that may implement the techniques described in this disclosure.

FIG. 4 is a block diagram illustrating an example video encoder 20 that may implement the unified intra BC and inter-prediction techniques described in this disclosure. Video encoder 20 may perform intra and inter coding of video blocks within video slices. Intra coding relies on spatial prediction to reduce or remove spatial redundancy in video within a given video frame or picture. Inter coding relies on temporal prediction to reduce or remove temporal redundancy in video within adjacent frames or pictures of a video sequence. Intra mode (I mode) may refer to any of several spatial based compression modes. As discussed above, video encoder 20 may be configured to code video data in one or more of a plurality of intra modes, including an intra DC mode, an intra angular, mode, an intra planar mode, and an intra BC mode. Inter modes, such as unidirectional prediction (P mode) or bi-prediction (B mode), may refer to any of several temporal-based compression modes.

In the example of FIG. 4, video encoder 20 includes video data memory 40, prediction processing unit 41, decoded picture buffer 64, summer 50, transform processing unit 52, quantization unit 54, and entropy encoding unit 56. Prediction processing unit 41 includes partition unit 35, motion estimation unit 42, motion compensation unit 44, and intra prediction processing unit 46. For video block reconstruction, video encoder 20 also includes inverse quantization unit 58, inverse transform processing unit 60, and summer 62. A deblocking filter (not shown in FIG. 4) may also be included to filter block boundaries to remove blockiness artifacts from reconstructed video. If desired, the deblocking filter filters the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. Decoded picture buffer (DPB) 64 is a buffer that stores reference video data for use in encoding video data by video encoder 20 (e.g., in intra or inter coding modes, also referred to as intra or inter prediction coding modes). Video data memory 40 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and DPB 64 may be provided by the same memory device or separate memory devices. In various examples, video data memory 40 may be on-chip with other components of video encoder 20, or off-chip relative to those components.

As shown in FIG. 4, video encoder 20 receives video data, and partition unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for a current video block based on error results (e.g., coding rate and the level of distortion). Prediction processing unit 41 may be configured to implement the techniques of this disclosure described herein for performing unified intra BC intra and inter-prediction. Prediction processing unit 41 may provide the resulting intra or inter coded block to summer 50 to generate residual block data and to summer 62 to reconstruct the encoded block for use as a reference picture.

Intra prediction processing unit 46 within prediction processing unit 41 may perform intra predictive coding of the current video block relative to one or more neighboring blocks in the same frame or slice as the current block to be coded to provide spatial compression. Motion estimation unit 42 and motion compensation unit 44 within prediction processing unit 41 perform inter predictive coding of the current video block relative to one or more predictive blocks in one or more reference pictures to provide temporal compression.

Motion estimation unit 42 may be configured to determine the inter prediction mode for a video slice according to a predetermined pattern for a video sequence. The predetermined pattern may designate video slices in the sequence as P slices, B slices or, in some examples, GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction processing unit 46 may intra predict a current block as an alternative to the inter prediction performed by motion estimation unit 42 and motion compensation unit 44, as described above. In particular, intra prediction processing unit 46 may determine an intra prediction mode, including an Intra BC mode, to use to encode a current block. In some examples, intra prediction processing unit 46 may encode a current block using various intra prediction modes, e.g., during separate encoding passes, and intra prediction processing unit 46 (or mode select unit, in some examples) may select an appropriate intra prediction mode to use from the tested modes.

For example, intra prediction processing unit 46 may calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra prediction mode exhibits the best rate-distortion value for the block.

In accordance with the techniques of this disclosure, as described above, video encoder 20, may be configured to determine a motion vector for an intra block copy (intra BC)-coded block coded using temporal motion vector prediction (TMVP), determine a co-located block based on the TMVP vector, responsive to determining that the co-located block is intra BCcoded, using the TMVP vector with integer-pixel precision to determine a reference block, and responsive to determining that he co-located block is inter-coded, use the TMVP vector with sub-pixel precision to determine the reference block.

In accordance with the techniques of this disclosure, video decoder may be configured to perform a generally reciprocal process for any process described herein with respect to a video encoder. Likewise, video encoder may be configured to perform a generally reciprocal process for any process described herein with respect to a video decoder.

In any case, after selecting an intra prediction mode for a block, intra prediction processing unit 46 may provide information indicative of the selected intra prediction mode for the block to entropy encoding unit 56. Entropy encoding unit 56 may encode the information indicating the selected intra prediction mode in accordance with the techniques of this disclosure. Video encoder 20 may include in the transmitted bitstream configuration data, which may include a plurality of intra prediction mode index tables and a plurality of modified intra prediction mode index tables (also referred to as codeword mapping tables), definitions of encoding contexts for various blocks, and indications of a most probable intra prediction mode, an intra prediction mode index table, and a modified intra prediction mode index table to use for each of the contexts.

After prediction processing unit 41 generates the predictive block for the current block via either inter prediction or intra prediction, video encoder 20 forms a residual block by subtracting the predictive block from the current block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-pixel precision values for use in motion estimation. Summer 62 adds the reconstructed residual block to the motion compensated prediction block produced by motion compensation unit 44 to produce a reference block for storage in decoded picture buffer 64. The reference block may be used by motion estimation unit 42 and motion compensation unit 44 as a reference block to inter predict a block in a subsequent video frame or picture.

According to aspects of this disclosure, video encoder 20 may be configured to perform any combination of the techniques described in this disclosure.

Figure 5:
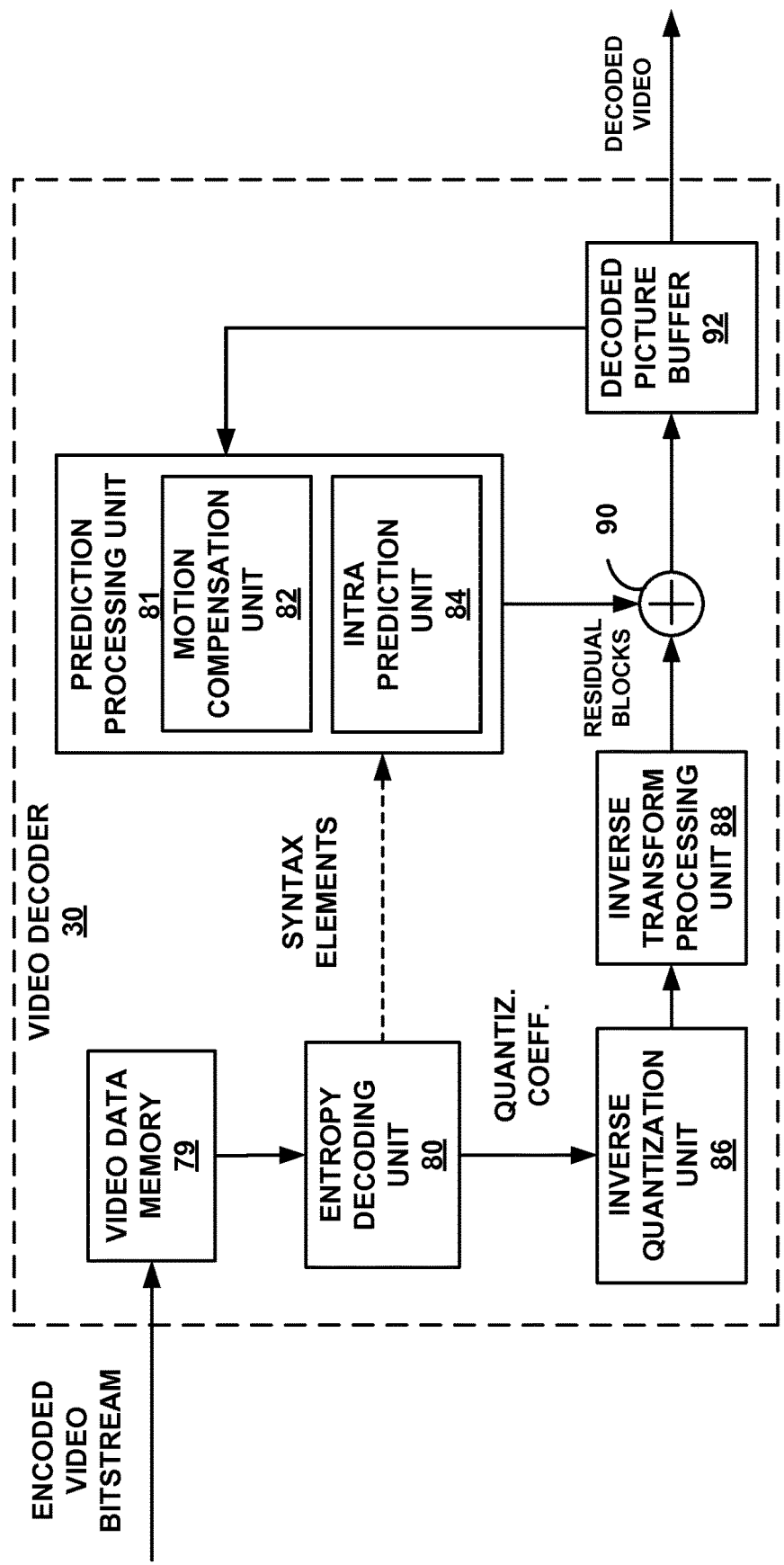
FIG. 5 is a block diagram illustrating an example video decoder that may implement the techniques described in this disclosure.

FIG. 5 is a block diagram illustrating an example video decoder 30 that may implement the techniques for unified intra BC and inter-prediction described in this disclosure. In the example of FIG. 5, video decoder 30 includes video data memory 79, entropy decoding unit 80, prediction processing unit 81, inverse quantization unit 86, inverse transformation processing unit 88, summer 90, and decoded picture buffer 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 4.

Video data memory 79 may store video data, such as an encoded video bitstream, to be decoded by the components of video decoder 30. The video data stored in video data memory 79 may be obtained, for example, from storage device 34, from a local video source, such as a camera, via wired or wireless network communication of video data, or by accessing physical data storage media. Video data memory 79 may form a coded picture buffer (CPB) that stores encoded video data from an encoded video bitstream. Decoded picture buffer 92 is one example of a decoding picture buffer (DPB) that stores reference video data for use in decoding video data by video decoder 30 (e.g., in intra or inter coding modes, also referred to as intra or inter prediction coding modes). Video data memory 79 and DPB 92 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 79 and DPB 92 may be provided by the same memory device or separate memory devices. In various examples, video data memory 79 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra coded (I) slice, intra prediction processing unit 84 of prediction processing unit 81 may generate prediction data for a video block of the current video slice based on a signaled intra prediction mode and data from previously decoded blocks of the current frame or picture. Prediction processing unit 81 may be configured to implement the techniques of this disclosure for performing unified intra BC and inter-prediction. When the video frame is coded as an inter coded (i.e., B, or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in decoded picture buffer 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 92, which stores reference pictures used for subsequent motion compensation. Decoded picture buffer 92 also stores decoded video for later presentation on a display device, such as display device 32 of FIG. 1.

According to aspects of this disclosure, video decoder 30 may be configured to perform any combination of the techniques described in this disclosure.

Figure 6:
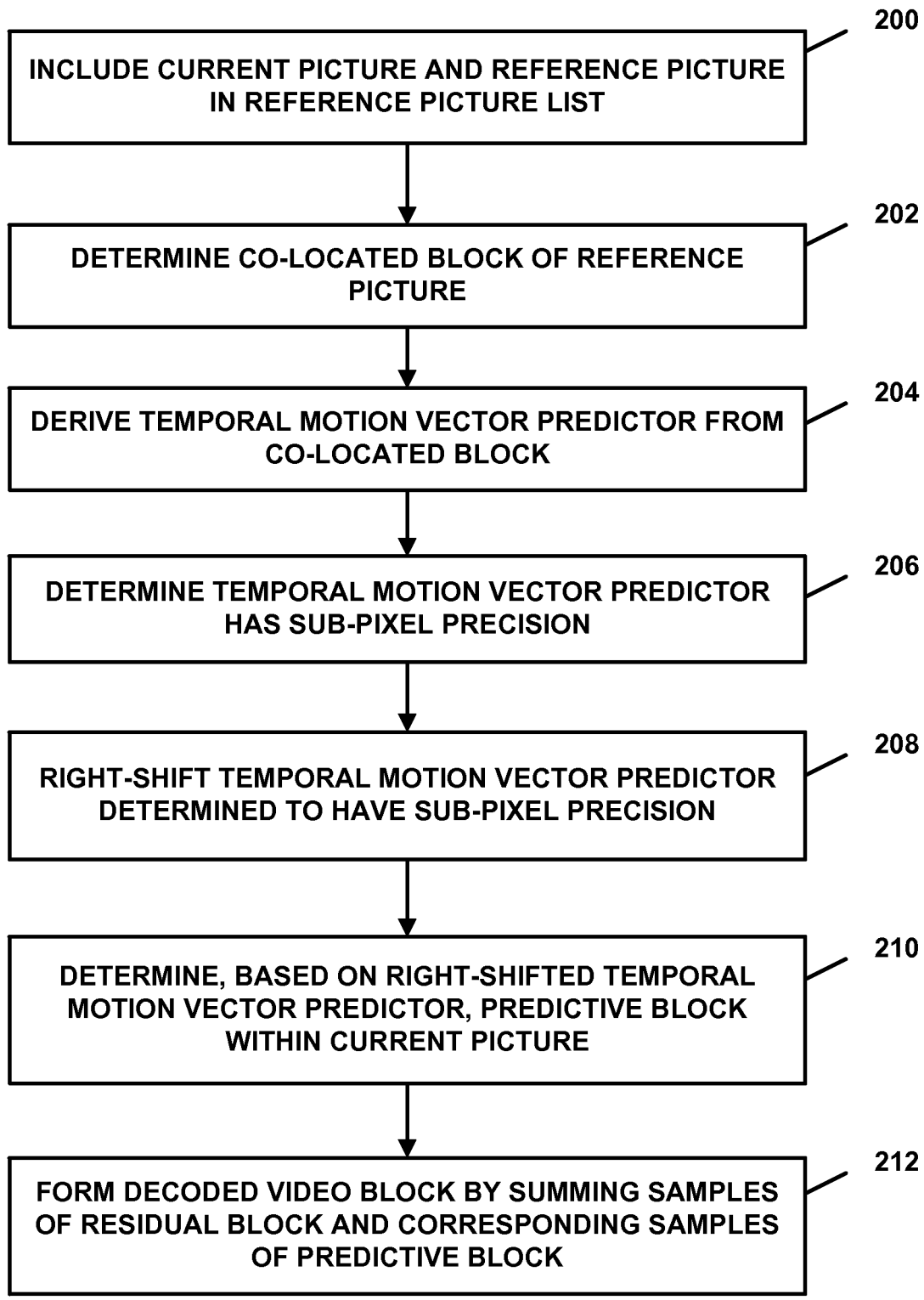
FIG. 6 is a flowchart illustrating an example process for decoding video data consistent with techniques of this disclosure.

FIG. 6 is a flowchart illustrating an example process for decoding video data consistent with techniques of this disclosure. The process of FIG. 6 is generally described as being performed by video decoder 30 for purposes of illustration, although a variety of other processors may also carry out the process shown in FIG. 6.

In the example of FIG. 6, video decoder 30 may include (200) a current picture and a reference picture in a reference picture list, the reference picture being different from the current picture. Video decoder 30 may determine (202) a co-located block of the reference picture, the co-located block being co-located with a current block of the current picture. Video decoder 30 may derive (204) a temporal motion vector predictor from the co-located block. Video decoder 30 may determine (206) the temporal motion vector predictor has sub-pixel precision. Video decoder 30 may right-shift (208) the temporal motion vector predictor determined to have sub-pixel precision. Video decoder 30 may determine (210), based on the right-shifted temporal motion vector predictor, a predictive block within the current picture. Video decoder 30 may form (212) a decoded video block by summing samples of a residual block and corresponding samples of the predictive block.

Figure 7:
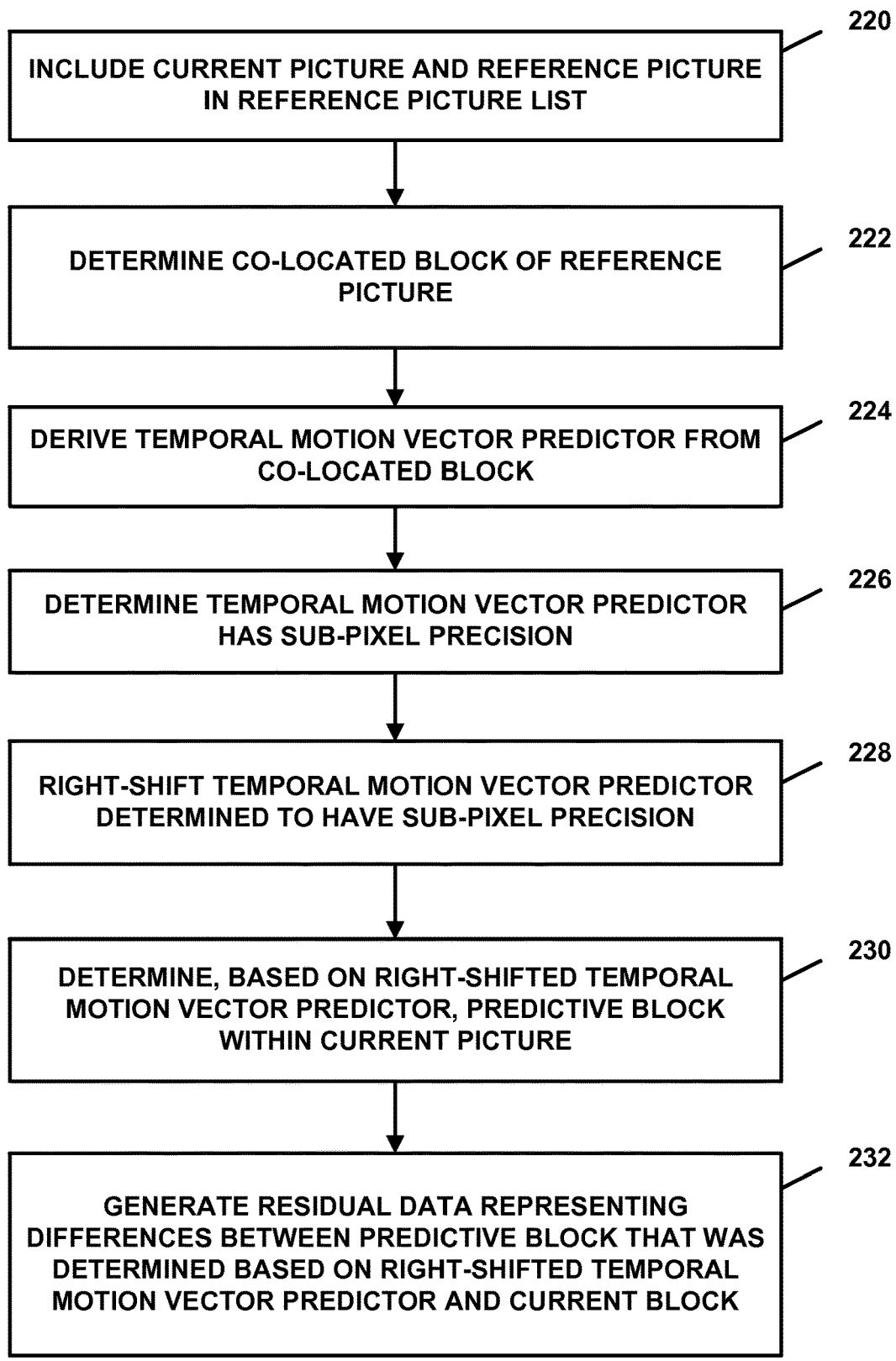
FIG. 7 is a flowchart illustrating an example process for encoding video data consistent with techniques of this disclosure.

FIG. 7 is a flowchart illustrating an example process for encoding video data consistent with techniques of this disclosure. The process of FIG. 7 is generally described as being performed by video encoder 20 for purposes of illustration, although a variety of other processors may also carry out the process shown in FIG. 7.

In the example of FIG. 7, video encoder 20 may include (220) a current picture and a reference picture in a reference picture list, the reference picture being different from the current picture. Video encoder 20 may determine (222) a co-located block of the reference picture, the co-located block being co-located with a current block of the current picture. Video encoder 20 may derive (224) a temporal motion vector predictor from the co-located block. Video encoder 20 may determine (226) the temporal motion vector predictor has sub-pixel precision. Video encoder 20 may right-shift (228) the temporal motion vector predictor determined to have sub-pixel precision. Video encoder 20 may determine (230), based on the right-shifted temporal motion vector predictor, a predictive block within the current picture. Video encoder 20 may generate (232) residual data representing differences between the predictive block that was determined based on the right-shifted temporal motion vector predictor and the current block.

Examples in accordance with the techniques of this disclosure are now described herein. It should be understood that a video coder such as video encoder 20 or video decoder 30 may perform the following examples.

Example 1

A method of encoding or decoding video data, the method comprising: determining a motion vector for an intra block copy (intra BC)-coded block coded using temporal motion vector prediction (TMVP); determining a co-located block based on the TMVP vector; responsive to determining that the co-located block is intra BC-coded, using the TMVP vector with integer-pixel precision to determine a reference block; and responsive to determining that he co-located block is inter-coded, using the TMVP vector with sub-integer-pixel precision to determine the reference block.

Example 2

The method of example 1, further comprising: encoding the intra-block copy-coded block based on the reference block or decoding the intra-block copy coded block based on the referenced block.

Example 3

The method of example 1, further comprising: when the TMVP vector has sub-integer pixel precision, right-shifting the TMVP motion vector.

Example 4

The method of example 1, further comprising: responsive to determining that that the co-located block is intra BC-coded, using the TMVP vector with sub-integer pixel precision.

Example 5

A method of encoding or decoding video data, the method comprising: coding an I-slice of video data; and deriving a value of an initType for a syntax element of the I-slice based on whether intra block copy mode is enabled for a block of the I-slice; and using the initType variable to determine a ctxIdx value for CABAC coding the syntax element.

Example 6

The method of example 5, further comprising: determining whether the syntax element is associated only with intra BC mode; and responsive to determining that the syntax element is associated only with intra BC mode, setting initType equal to 0.

Example 7

The method of example 5, further comprising CABAC encoding the syntax element.

Example 8

The method of example 5, further comprising CABAC decoding the syntax element.

Example 9

The method of example 5, further comprising: allowing both intra and inter-prediction modes for the I-slice when intra BC mode is enabled for the I-slice.

Example 10

A method of encoding or decoding video data, the method comprising: coding a slice of a picture, responsive to determining that intra block copy (intra BC) mode is enabled and the slice is an I-slice or responsive to determining that the slice is a P or B slice: modifying a reference picture list construction when intra BC mode is enabled for the slice.

Example 11

The method of example 10, further comprising: using only one reference picture list when the slice is an I-slice and when the intra BC mode is enabled for the slice.

Example 12

The method of example 10, further comprising: using a second independent reference picture list when the slice is an I-slice and when the intra BC mode is enabled for the slice.

Example 13

The method of example 10, further comprising: inserting a current picture of the slice at the end of the reference picture list.

Example 14

The method of example 10, further comprising: adding a current picture of the slice at a beginning or before long term reference pictures of the reference picture list.

Example 15

The method of example 14, wherein the slice is a P slice or a B slice.

Example 16

The method of example 10, further comprising: adding a current picture at a location of the reference picture list based on a slice type of the slice.

Example 17

The method of example 10, further comprising: adding a current picture at a location of the reference picture list based on a prediction type of the current picture.

Example 18

The method of example 10, further comprising: determining a reference picture from the reference picture list; and foregoing in-loop filtering, deblocking, and sample adaptive offset for the reference picture when the reference picture is a previously-decoded picture or the picture.

Example 19

The method of example 10, further comprising: determining for a coding unit of the picture that a intra BC mode is enabled for the coding unit and skip mode is enable for the coding unit; responsive to determining that skip mode is enabled for the coding unit, parsing only merge candidate syntax elements during the reference picture list construction.

Example 20

The method of example 10, further comprising: determining that intra BC mode is enabled for the slice; and responsive to determining that intra BC mode is enabled for the slice, determining that a decoding process for the picture is not altered.

Example 21

The method of example 10, further comprising: encoding the reference picture list.

Example 22

The method of example 10, further comprising: decoding the reference picture list. In one example of the disclosure, the intra prediction mode comprises one or more of the intra BC mode, an intra Angular mode, an intra Planar mode, or an intra DC mode, and the current block of video data is in any of an I slice, a P slice, or a B slice.

Example 23

Any combination of any of the examples described in this disclosure.

In another example of the disclosure, video encoder 20 may be further configured to determine a particular reference block of the one or more reference blocks to be used as a predictive block for the current block of video data, wherein encoding the current block of video data using the intra BC mode comprises predicting the current block of video data from the predictive block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

Certain aspects of this disclosure have been described with respect to one or more video coding standards (e.g., the HEVC standard) for purposes of illustration. However, the techniques described in this disclosure may be useful for other video coding processes, including other standard or proprietary video coding processes not yet developed or still in development.

The techniques described herein may be performed by video encoder 20 (e.g., FIGS. 1 and 4) and/or video decoder 30 (e.g., FIGS. 1 and 5), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure. The techniques described in this disclosure may be used together in any combination.

In one or more examples, the functions described in this disclosure may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. However, it should be understood that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above may also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques may be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding encoded video data, the method comprising:
    including a current picture and a reference picture in a reference picture list, the reference picture being different from the current picture;
    determining a co-located block of the reference picture, the co-located block being co-located with respect to a current block of the current picture;
    deriving a temporal motion vector predictor from the co-located block of the reference picture;
    determining that the temporal motion vector predictor has a sub-pixel precision;
    based on the temporal motion vector predictor having the sub-pixel precision, right-shifting the temporal motion vector predictor to form an integer-pixel precision temporal motion vector predictor;
    determining, based on a displacement from the current block indicated by the integer-pixel precision temporal motion vector predictor, a predictive block within the current picture; and
    forming a decoded video block according to an intra block copy mode by summing samples of a residual block and corresponding samples of the predictive block determined based on the displacement indicated by the integer-pixel precision temporal motion vector from the current block.

2. The method of claim 1, wherein the reference picture list is a first reference picture list, the method further comprising:
    determining that the intra block copy mode is enabled for a B slice of the current picture; and
    based on the intra block copy mode being enabled for the B slice of the current picture, constructing a second reference picture list for the B slice of the current picture, the second reference picture list including the current picture.

3. The method of claim 1, wherein the current picture is a first picture and the reference picture list is a first reference picture list, the method further comprising:
    obtaining, from an encoded video bitstream, a syntax element indicating that the intra block copy mode is enabled for a second picture; and
    as part of decoding an I slice of the second picture, constructing, responsive to determining that the syntax element indicates that the intra block copy mode is enabled for the second picture, a second reference picture list, the second reference picture list including the second picture.

4. The method of claim 1, wherein including the current picture and the reference picture in the reference picture list comprises performing one of:
    including, in the reference picture list, the current picture at a first location in the reference picture list before the respective location of any long term pictures included in the reference picture list, or
    including, in the reference picture list, the current picture at a second location in the reference picture list, the second location being based on whether a slice of the current picture is an I slice, a P slice, or a B slice.

5. The method of claim 1, further comprising generating a motion vector candidate list that includes one or more motion vector candidates respectively for a first block of the encoded video data encoded according to the intra block copy mode and a second block of the encoded video data encoded according to an inter-prediction mode.

6. A method of encoding video data, the method comprising:
    including a current picture and a reference picture in a reference picture list, the reference picture being different from the current picture;
    determining a co-located block of the reference picture, the co-located block being co-located with respect to a current block of the current picture;
    deriving a temporal motion vector predictor from the co-located block of the reference picture;
    determining that the temporal motion vector predictor has a sub-pixel precision;
    based on the temporal motion vector predictor having the sub-pixel precision, right-shifting the temporal motion vector predictor to form an integer-pixel precision temporal motion vector predictor;

determining, based on a displacement from the current block indicated by the integer-pixel precision temporal motion vector predictor, a predictive block within the current picture; and generating, according to an intra block copy mode, residual data representing differences between corresponding samples of the current block and the predictive block determined based on the integer-pixel precision temporal motion vector predictor.

7. The method of claim 6, wherein the reference picture list is a first reference picture list, the method further comprising:

enabling the intra block copy mode with respect to a B slice of the current picture; and based on the intra block copy mode being enabled for the B slice of the current picture, constructing a second reference picture list for the B slice of the current picture, the second reference picture list including the current picture.

8. The method of claim 6, wherein the current picture is a first picture, the reference picture list is a first reference picture list, the method further comprising:

constructing a second reference picture list for an I slice of a second picture based on the intra block copy mode being enabled for the I slice, the second reference picture list including the second picture.

9. The method of claim 6, wherein including the current picture and the reference picture in the reference picture list comprises performing one of:

including, in the reference picture list, the current picture at a first location in the reference picture list before the respective location of any long term pictures included in the reference picture list, or including, in the reference picture list, the current picture at a second location in the reference picture list, the second location being based on whether a slice of the current picture is an I slice, a P slice, or a B slice.

10. The method of claim 6, further comprising generating a motion vector candidate list that includes one or more motion vector candidates respectively for a first block encoded according to the intra block copy mode and a second block encoded according to an inter-prediction mode.

11. A device for decoding encoded video data, the device comprising:

a memory configured to store video data representative of a reference picture; and one or more processors configured to:

include a current picture and the reference picture in a reference picture list, the current picture being different from the reference picture stored to the memory;

determine a co-located block of the reference picture, the co-located block being co-located with respect to a current block of the current picture;

derive a temporal motion vector predictor from the co-located block of the reference picture;

determine that the temporal motion vector predictor has a sub-pixel precision;

based on the temporal motion vector predictor having the sub-pixel precision, right-shift the temporal motion vector predictor to form an integer-pixel precision temporal motion vector predictor;

determine, based on a displacement from the current block indicated by the integer-pixel precision temporal motion vector predictor, a predictive block within the current picture; and form a decoded video block according to an intra block copy mode by summing samples of a residual block and corresponding samples of the predictive block determined based on the displacement indicated by the integer-pixel precision temporal motion vector from the current block.

12. The device of claim 11, wherein the reference picture list is a first reference picture list, the one or more processors being further configured to:

determine that the intra block copy mode is enabled for a B slice of the current picture; and based on the intra block copy mode being enabled for the B slice of the current picture, construct a second reference picture list for the B slice of the current picture, the second reference picture list including the current picture.

13. The device of claim 11, wherein the current picture is a first picture, the reference picture list is a first reference picture list, the one or more processors being further configured to:

obtain, from an encoded video bitstream, a syntax element indicating that the intra block copy mode is enabled for a second picture; and to decode an I slice of the second picture, construct, responsive to the determination the syntax element indicates that the intra block copy is enabled for the second picture, a second reference picture list, the second reference picture list including the second picture.

14. The device of claim 11, wherein to include the current picture and the reference picture in the reference picture list, the one or more processors are configured to perform one of:

include, in the reference picture list, the current picture at a first location in the reference picture list before the respective location of any long term pictures in the reference picture list, or include, in the reference picture list, the current picture at a second location in the reference picture list, the second location being based on whether a slice of the current picture is an I slice, a P slice, or a B slice.

15. The device of claim 11, wherein the one or more processors are further configured to generate a motion vector candidate list that includes one or more motion vector candidates respectively for a first block of the encoded video data encoded according to the intra block copy mode and a second block of the encoded video data encoded according to an inter-prediction mode.

16. The device of claim 11, wherein the device comprises at least one of:

an integrated circuit;
a microprocessor;
one or more digital signal processors (DSPs);
one or more field programmable gate arrays (FPGAs);
a desktop computer;
a laptop computer;
a tablet computer;
a phone;
a television;
a digital media player;
a video game console;
a video game device;
a video streaming device; or
a wireless communication device.

17. The device of claim 11, wherein the device further comprises a display configured to display decoded video data corresponding to the current picture.

18. The device of claim 11, wherein the one or more processors are further configured to encode the video data, the device further comprising a camera configured to capture video data corresponding to the current picture.

19. A device for encoding video data, the device comprising:
a memory configured to store video data representative of a reference picture; and
one or more processors configured to:
include a current picture and the reference picture in a reference picture list, the current picture being different from the reference picture stored to the memory;
determine a co-located block of the reference picture, the co-located block being co-located with respect to a current block of the current picture;
derive a temporal motion vector predictor from the co-located block of the reference picture;
determine that the temporal motion vector predictor has a sub-pixel precision;
based on the temporal motion vector predictor having the sub-pixel precision, right-shift the temporal motion vector predictor to form an integer-pixel precision temporal motion vector predictor;
determine, based on a displacement from the current block indicated by the integer-pixel precision temporal motion vector predictor, a predictive block within the current picture; and
generate, according to an intra block copy mode, residual data representing differences between corresponding samples of the current block and the predictive block determined based on the integer-pixel precision temporal motion vector predictor.

20. The device of claim 19, wherein the reference picture list is a first reference picture list, the one or more processors being further configured to:
enable the intra block copy mode with respect to a B slice of the current picture; and
based on the intra block copy mode being enabled for the B slice of the current picture, construct a second reference picture list for the B slice of the current picture, the second reference picture list including the current picture.

21. The device of claim 19, wherein the current picture is a first picture, the reference picture list is a first reference picture list, the one or more processors being further configured to:
construct a second reference picture list for an I slice of a second picture based on the intra block copy mode being enabled for the I slice, the second reference picture list including the second picture.

22. The device of claim 19, wherein to include the current picture and the reference picture in the reference picture list, the one or more processors are configured to perform one of:
include, in the reference picture list, the current picture at a first location in the reference picture list before the respective location of any long term pictures included in the reference picture list, or
include, in the reference picture list, the current picture at a second location in the reference picture list, the second location being based on whether a slice of the current picture is an I slice, a P slice, or a B slice.

23. The device of claim 19, wherein the one or more processors are further configured to generate a motion vector candidate list that includes one or more motion vector candidates respectively for a first block encoded according to the intra block copy mode and a second block encoded according to an inter-prediction mode.

24. The device of claim 19, wherein the device comprises at least one of:
an integrated circuit;
a microprocessor;
one or more digital signal processors (DSPs);
one or more field programmable gate arrays (FPGAs);
a desktop computer;
a laptop computer;
a tablet computer;
a phone;
a television;
a digital media player;
a video game console;
a video game device;
a video streaming device; or
a wireless communication device.

25. The device of claim 19, wherein the device further comprises a display configured to display decoded video data corresponding to the current picture.

26. The device of claim 19, wherein the one or more processors are further configured to encode video data corresponding to the current picture, the device further comprising a camera configured to capture the video data corresponding to the current picture.

27. An apparatus for decoding encoded video data, the apparatus comprising:
means for including a current picture and a reference picture in a reference picture list, the reference picture being different from the current picture;
means for determining a co-located block of the reference picture, the co-located block being co-located with respect to a current block of the current picture;
means for deriving a temporal motion vector predictor from the co-located block of the reference picture;
means for determining that the temporal motion vector predictor has a sub-pixel precision;
means for right-shifting, based on the temporal motion vector predictor having the sub-pixel precision, the temporal motion vector predictor to form an integer-pixel precision temporal motion vector predictor;
means for determining, based on a displacement from the current block indicated by the integer-pixel precision temporal motion vector predictor, a predictive block within the current picture; and
means for forming a decoded video block according to an intra block copy mode by summing samples of a residual block and corresponding samples of the predictive block determined based on the displacement indicated by the integer-pixel precision temporal motion vector from the current block.

28. A non-transitory computer-readable storage medium having instructions stored thereon that, when executed, cause one or more processors of a computing device configured to decode encoded video data to:
include a current picture and a reference picture in a reference picture list, the reference picture being different from the current picture;
determine a co-located block of the reference picture, the co-located block being co-located with respect to a current block of the current picture;
derive a temporal motion vector predictor from the co-located block of the reference picture;

determine that the temporal motion vector predictor has a sub-pixel precision;
based on the temporal motion vector predictor having the sub-pixel precision, right-shift the temporal motion vector predictor to form an integer-pixel precision temporal motion vector predictor;
determine, based on a displacement from the current block indicated by the integer-pixel precision temporal motion vector predictor, a predictive block within the current picture; and
form a decoded video block according to an intra block copy mode by summing samples of a residual block and corresponding samples of the predictive block determined based on the displacement indicated by the integer-pixel precision temporal motion vector from the current block.

* * * * *